(12) United States Patent
Shatunov et al.

(10) Patent No.: US 9,406,974 B2
(45) Date of Patent: Aug. 2, 2016

(54) ADDITIVE FOR ELECTROLYTE OF LITHIUM BATTERY, ORGANIC ELECTROLYTIC SOLUTION COMPRISING THE SAME, AND LITHIUM BATTERY USING THE ORGANIC ELECTROLYTIC SOLUTION

(71) Applicant: Samsung SDI Co., Ltd., Yongin-si, Gyeonggi-Do (KR)

(72) Inventors: Pavel Alexandrovich Shatunov, Yongin-si (KR); Woo-Cheol Shin, Yongin-si (KR); Sang-Hoon Kim, Yongin-si (KR); Jung-Yi Yu, Yongin-si (KR); Ha-Rim Lee, Yongin-si (KR); In-Haeng Cho, Yongin-si (KR); Khasanov Makhmut, Yongin-si (KR)

(73) Assignee: Samsung SDI Co., Ltd., Gyeonggi-Do (KR)

( * ) Notice: Subject to any disclaimer, the term of this patent is extended or adjusted under 35 U.S.C. 154(b) by 178 days.

(21) Appl. No.: 14/150,429

(22) Filed: Jan. 8, 2014

(65) Prior Publication Data

US 2014/0322596 A1    Oct. 30, 2014

(51) Int. Cl.
| | |
|---|---|
| C07F 9/02 | (2006.01) |
| C07C 255/00 | (2006.01) |
| C07D 333/12 | (2006.01) |
| H01M 6/04 | (2006.01) |
| H01M 10/0567 | (2010.01) |
| H01M 4/62 | (2006.01) |
| H01M 10/052 | (2010.01) |
| H01M 4/587 | (2010.01) |

(52) U.S. Cl.
CPC .......... *H01M 10/0567* (2013.01); *H01M 4/587* (2013.01); *H01M 4/625* (2013.01); *H01M 10/052* (2013.01); *H01M 2300/0025* (2013.01); *Y02E 60/122* (2013.01)

(58) Field of Classification Search
CPC ............ H01M 10/0567; H01M 4/625; H01M 10/052; H01M 4/587; H01M 2300/0025; Y02E 60/122
USPC ............. 429/188; 549/74; 558/167, 397, 409, 558/437, 454
See application file for complete search history.

(56) References Cited

U.S. PATENT DOCUMENTS

| | | | |
|---|---|---|---|
| 8,148,029 B2 | 4/2012 | Kim et al. | |
| 2009/0111965 A1* | 4/2009 | Lee | G03F 7/422 528/229 |
| 2011/0059356 A1 | 3/2011 | Ogasawara et al. | |
| 2011/0229770 A1 | 9/2011 | Yun et al. | |
| 2011/0311864 A1 | 12/2011 | Yamada et al. | |
| 2012/0202123 A1 | 8/2012 | Jeon et al. | |
| 2013/0004861 A1 | 1/2013 | Yu et al. | |

OTHER PUBLICATIONS

Extended European Search Report dated Jun. 26, 2015 for European Patent Application No. EP 14 151 904.1 which shares priority of U.S. Appl. No. 61/816,120, filed Apr. 25, 2013, with captioned U.S. Appl. No. 14/150,429.
Partial European Search Report dated Sep. 17, 2014 for European Patent Application No. EP 14 15 1904.1 which shares priority of U.S. Appl. No. 61/816,120, filed Apr. 25, 2013, with captioned U.S. Appl. No. 14/150,429.

* cited by examiner

*Primary Examiner* — William Cheung
(74) *Attorney, Agent, or Firm* — Knobbe Martens Olson & Bear, LLP

(57) ABSTRACT

In an aspect, an additive for an electrolyte of a lithium battery, the additive including a compound including at least three nitrile moieties is provided.

14 Claims, 7 Drawing Sheets

ADDITIVE FOR ELECTROLYTE OF LITHIUM BATTERY, ORGANIC ELECTROLYTIC SOLUTION COMPRISING THE SAME, AND LITHIUM BATTERY USING THE ORGANIC ELECTROLYTIC SOLUTION

INCORPORATION BY REFERENCE TO ANY PRIORITY APPLICATIONS

Any and all priority claims identified in the Application Data Sheet, or any correction thereto, are hereby incorporated by reference under 37 CFR 1.57.

BACKGROUND

1. Field

This disclosure relates to an additive for an electrolyte of a lithium secondary battery, an organic electrolytic solution including the additive, and a lithium battery including the organic electrolytic solution.

2. Description of the Related Technology

Lithium batteries are used as driving power sources for portable electronic devices, including camcorders, mobile phones, and laptop computers. Lithium secondary batteries are rechargeable at high rates and have a high energy density per unit weight of about three times higher than that of conventional lead storage batteries, nickel-cadmium (Ni—Cd) batteries, nickel-hydrogen batteries, and nickel-zinc batteries.

Since lithium batteries operate at high operating voltages, they are not compatible with aqueous electrolytes highly reactive to lithium. Lithium batteries mostly use organic electrolytic solutions. An organic electrolytic solution may be prepared by dissolving a lithium salt in an organic solvent. An appropriate organic solvent for the organic electrolytic solution may be stable at high voltages, and have a high ionic conductivity, a high dielectric constant, and a low viscosity.

When a lithium battery uses a carbonate-based polar non-aqueous solvent, an irreversible side reaction between the electrolyte solution and a positive or negative electrode may occur during an initial charging process, causing excess consumption of charges.

As a result of the irreversible side reaction, a passivation layer such as a solid electrolyte interface (SEI) may be formed on a surface of the negative electrode. The SEI may prevent decomposition of the electrolyte solution during charging and discharging and may serve as an ion channel. The higher stability and smaller resistance the SEI has, the better lifetime characteristics the lithium battery may have.

The irreversible side reaction may also result in a protection layer on a surface of the positive electrode. The protection layer may prevent decomposition of the electrolyte solution during charging and discharging and may serve as an ion channel. The higher stability and smaller resistance the protection layer has, the better lifetime characteristics the lithium battery may have.

Therefore, there is a demand for an organic electrolytic solution able to form such a SEI and protection layer with improved stability and low resistance.

SUMMARY

One or more embodiments include an additive for an electrolyte of a lithium battery.

One or more embodiments include an organic electrolytic solution including the additive.

One or more embodiments include a lithium battery including the organic electrolytic solution.

Some embodiments provide an additive for an electrolyte of a lithium battery includes a compound represented by Formula 1 below:

Formula 1 wherein, in Formula 1, R is an unsaturated functional group or a polar functional group including a hetero atom of Group 13 to Group 16 of the periodic table of the elements; and X is a substituted or unsubstituted $C_2$-$C_{20}$ linear or branched alkylene group, wherein a substituent of the substituted $C_2$-$C_{20}$ linear or branched alkylene group includes a saturated nonpolar functional group, a unsaturated functional group, or a polar functional group including a hetero atom of Group 13 to Group 16 of the periodic table of the elements. In some embodiments, R may be selected from the group consisting of an unsubstituted or substituted $C_2$-$C_{20}$ alkenyl, an unsubstituted or substituted $C_2$-$C_{20}$ alkynyl, an unsubstituted or substituted $C_3$-$C_8$ cycloalkenyl, an unsubstituted or substituted $C_6$-$C_{40}$ aryl, an unsubstituted or substituted $C_1$-$C_{40}$ heteroaryl, and an unsubstituted or substituted $C_2$-$C_{40}$ partially unsaturated heterocyclyl, or R may be a polar functional group including a hetero atom; and X may be an unsubstituted $C_2$-$C_{20}$ alkylene group, or X may be a $C_2$-$C_{20}$ alkylene group substituted with one or more $R^{20}$ groups where each $R^{20}$ may be independently selected from the group consisting of a halo, an unsubstituted or substituted $C_1$-$C_{20}$ alkyl, an unsubstituted or substituted $C_2$-$C_{20}$ alkenyl, an unsubstituted or substituted $C_2$-$C_{20}$ alkynyl, an unsubstituted or substituted $C_3$-$C_8$ cycloalkyl, an unsubstituted or substituted —O—($C_1$-$C_8$ alkyl), an unsubstituted or substituted $C_6$-$C_{40}$ aryl, an unsubstituted or substituted $C_1$-$C_{40}$ heteroaryl, an unsubstituted or substituted $C_2$-$C_{40}$ heterocyclyl and a polar functional group including a hetero atom.

Some embodiments provide an organic electrolytic solution includes a lithium salt, an organic solvent, and the above-defined additive.

Some embodiments provide a lithium battery includes a positive electrode, a negative electrode, and the above-defined organic electrolytic solution.

As described above, according to the embodiments of the present disclosure, a lithium battery including an organic electrolytic solution including an additive of Formula 1 above may have improved lifetime characteristics.

Figure 1A:
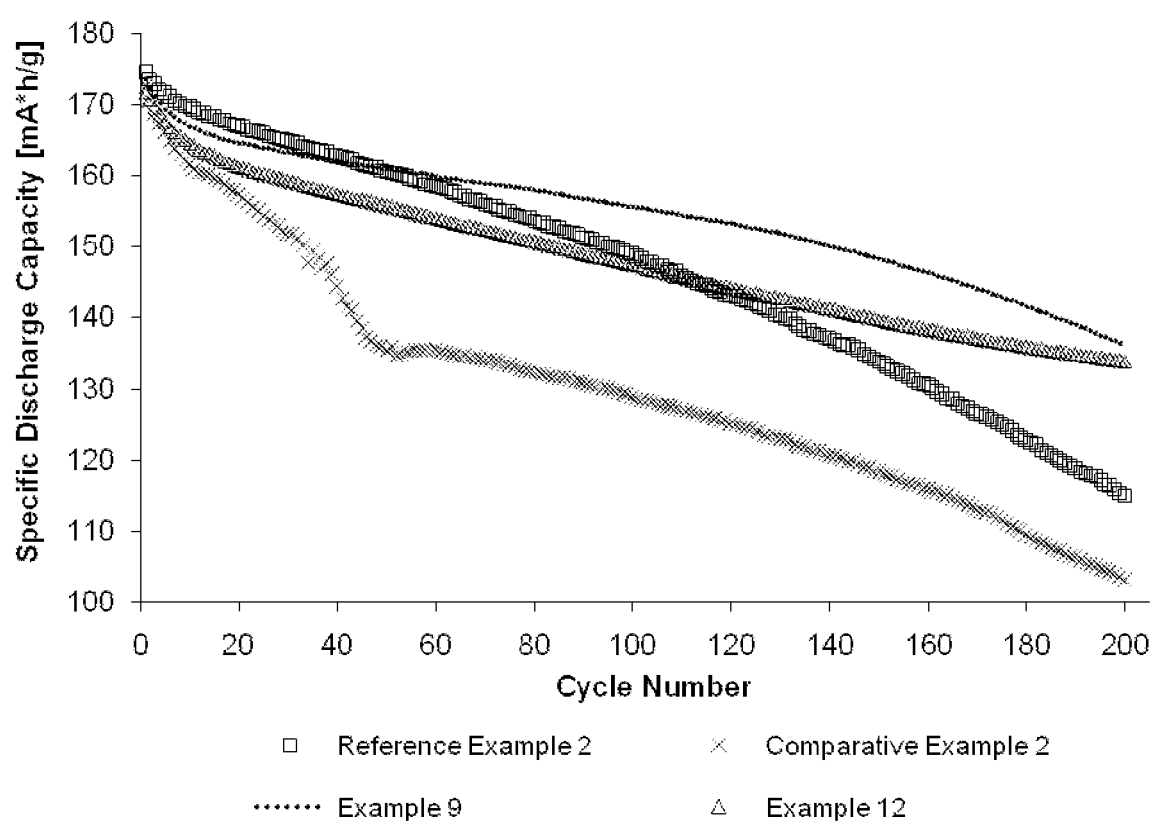
FIG. 1A is a graph of discharge capacity with respect to number of charge/discharge cycles in lithium batteries of Examples 9 and 12, Reference Example 2, and Comparative Example 2.

Listing of Reference numerals denoting major elements in the drawings

| | |
|---|---|
| 1: lithium battery | 2: negative electrode |
| 3: positive electrode | 4: separator |
| 5: battery case | 6: cap assembly |

DETAILED DESCRIPTION

Hereinafter, one or more embodiments of an additive for electrolytes of lithium secondary batteries, an organic electrolytic solution including the additive, and a lithium battery including the organic electrolytic solution will be described in greater detail.

As used herein, "$C_a$ to $C_b$" or "$C_{a-b}$" in which "a" and "b" are integers refer to the number of carbon atoms in the specified group. That is, the group can contain from "a" to "b", inclusive, carbon atoms. Thus, for example, a "$C_1$ to $C_4$ alkyl" or "$C_{1-4}$ alkyl" group refers to all alkyl groups having from 1 to 4 carbons, that is, $CH_3$—, $CH_3CH_2$—, $CH_3CH_2CH_2$—, $(CH_3)_2CH$—, $CH_3CH_2CH_2CH_2$—, $CH_3CH_2CH(CH_3)$— and $(CH_3)_3C$—.

It is to be understood that certain radical naming conventions can include either a mono-radical or a di-radical, depending on the context. For example, where a substituent requires two points of attachment to the rest of the molecule, it is understood that the substituent is a di-radical. For example, a substituent identified as alkyl that requires two points of attachment includes di-radicals such as —$CH_2$—, —$CH_2CH_2$—, —$CH_2CH(CH_3)CH_2$—, and the like. Other radical naming conventions clearly indicate that the radical is a di-radical such as "alkylene" or "alkenylene."

As used herein, the term "alkyl" or "alkylene" refers to a branched or unbranched aliphatic hydrocarbon group. In some embodiments, alkyls may be substituted or unsubstituted. Alkyls include, but are not limited to, methyl, ethyl, propyl, isopropyl, butyl, isobutyl, tertiary butyl, pentyl, hexyl, cyclopropyl, cyclopentyl, cyclohexyl, cycloheptyl and the like, each of which may be optionally substituted in some embodiments. In some embodiments, the alkyl may have from 1 to 6 carbon atoms. For example, $C_{1-6}$ alkyl includes, but is not limited to, methyl, ethyl, propyl, isopropyl, butyl, iso-butyl, sec-butyl, pentyl, 3-pentyl, hexyl, and the like.

As used herein, the term "alkoxy" refers to the formula —OR wherein R is an alkyl as is defined above, such as "$C_{1-9}$ alkoxy", including but not limited to methoxy, ethoxy, n-propoxy, 1-methylethoxy(isopropoxy), n-butoxy, iso-butoxy, sec-butoxy, and tert-butoxy, and the like.

As used herein, the term "cycloalkyl" refers to a fully saturated carbocyclyl ring or ring system. Examples include cyclopropyl, cyclobutyl, cyclopentyl, and cyclohexyl.

As used herein, the term "alkenyl" or "alkenylene" refers to a hydrocarbon group of from two to twenty carbon atoms containing at least one carbon-carbon double bond including, but not limited to, ethenyl, 1-propenyl, 2-propenyl, 2-methyl-1-propenyl, 1-butenyl, 2-butenyl, cyclopropenyl, cyclopentenyl, cyclohexenyl, cycloheptenyl and the like. In some embodiments, alkenyls may be substituted or unsubstituted. In some embodiments, the alkenyl may from 2 to 40 carbon atoms.

As used herein, the term "alkynyl" or "alkynylene" refers to a hydrocarbon group of from two to twenty carbon atoms containing at least one carbon-carbon triple bond including, but not limited to, ethynyl, 1-propynyl, 1-butynyl, 2-butynyl, and the like. In some embodiments, alkynyls may be substituted or unsubstituted. In some embodiments, the alkynyl may have from 2 to 4 carbon atoms.

As used herein, the term "aromatic" refers to a ring or ring system having a conjugated pi electron system and includes both carbocyclic aromatic (e.g., phenyl) and heterocyclic aromatic groups (e.g., pyridine). The term includes monocyclic or fused-ring polycyclic (i.e., rings which share adjacent pairs of atoms) groups provided that the entire ring system is aromatic.

As used herein, the term "aryl" or "arylene" refers to an aromatic ring or ring system (i.e., two or more fused rings that share two adjacent carbon atoms) containing only carbon in the ring backbone. When the aryl is a ring system, every ring in the system is aromatic. Examples of aryl groups include, but are not limited to, phenyl, biphenyl, naphthyl, phenanthrenyl, naphthacenyl, and the like. In some embodiments, aryls may be substituted or unsubstituted.

As used herein, the term "heteroaryl" or "heteroarylene" refers to an aromatic ring system radical in which one or more ring atoms are not carbon, namely heteroatom, having one ring or multiple fused rings. In fused ring systems, the one or more heteroatoms may be present in only one of the rings. Examples of heteroatoms include, but are not limited to, oxygen, sulfur and nitrogen. Examples of heteroaryl groups include, but are not limited to, furanyl, thienyl, imidazolyl, quinazolinyl, quinolinyl, isoquinolinyl, quinoxalinyl, pyridinyl, pyrrolyl, oxazolyl, indolyl, and the like.

As used herein, the term "aralkyl," "alkylaryl" or "alkylarylene" refers to an aryl group connected, as a substituent, via an alkylene group, such as "$C_{7-14}$ aralkyl" and the like, including but not limited to benzyl, 2-phenylethyl, 3-phenylpropyl, and naphthylalkyl. In some cases, the alkylene group is a lower alkylene group (i.e., a $C_{1-4}$ alkylene group).

As used herein, "cycloalkenyl" or "cycloalkylene" refers to a carbocyclyl ring or ring system having at least one double bond, wherein no ring in the ring system is aromatic. An example is cyclohexenyl.

As used herein, "heterocyclyl" means a non-aromatic cyclic ring or ring system containing at least one heteroatom in the ring backbone.

As used herein, the term "partially unsaturated heterocyclyl" refers to a non-aromatic cyclic ring or ring system containing at least one heteroatom and at least one double bond in the ring backbone system.

As used herein, the term "halogen" or "halo," refers to any one of the radio-stable atoms of column 7 of the Periodic Table of the Elements, e.g., fluorine, chlorine, bromine, or iodine, with fluorine and chlorine being preferred.

As used herein, a substituted group is derived from the unsubstituted parent group in which there has been an exchange of one or more hydrogen atoms for another atom or group. Unless otherwise indicated, when a group is deemed to be "substituted," it is meant that the group is substituted with one or more substituents independently selected from $C_1$-$C_{40}$ alkyl, $C_2$-$C_{40}$ alkenyl, $C_2$-$C_{40}$ alkynyl, $C_3$-$C_{40}$ cycloalkyl, $C_3$-$C_{40}$ cycloalkenyl, $C_1$-$C_{40}$ alkoxy, aryl, heteroaryl, heterocyclyl, aralkyl, partially unsaturated heterocyclyl, halo, cyano, hydroxy, and nitro. Wherever a group is described as "optionally substituted" that group can be substituted with the above substituents.

According to an embodiment of the present invention, an additive for an electrolyte of a lithium battery includes a compound represented by Formula 1 below:

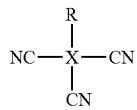

Formula 1 wherein, in Formula 1, R is an unsaturated functional group or a polar functional group including a hetero atom of Group 13 to Group 16 of the periodic table of the elements; and X is a substituted or unsubstituted $C_2$-$C_{20}$ linear or branched alkylene group, wherein a substituent of the substituted $C_2$-$C_{20}$ linear or branched alkylene group includes a saturated nonpolar functional group, a unsaturated functional group, or a polar functional group including a hetero atom of Group 13 to Group 16 of the periodic table of the elements. When using an electrolytic solution including the compound of Formula 1 as an additive, a lithium battery may have improved performance, for example, improved lifetime characteristics. In some embodiments, R may be selected from the group consisting of an unsubstituted or substituted $C_2$-$C_{20}$ alkenyl, an unsubstituted or substituted $C_2$-$C_{20}$ alkynyl, an unsubstituted or substituted $C_3$-$C_8$ cycloalkenyl, an unsubstituted or substituted $C_6$-$C_{40}$ aryl, an unsubstituted or substituted $C_1$-$C_{40}$ heteroaryl, and an unsubstituted or substituted $C_2$-$C_{40}$ partially unsaturated heterocyclyl, or R may be a polar functional group including a hetero atom; and X may be an unsubstituted $C_2$-$C_{20}$ alkylene group, or X may be a $C_2$-$C_{20}$ alkylene group substituted with one or more $R^{20}$ groups where each $R^{20}$ may be independently selected from the group consisting of a halo, an unsubstituted or substituted $C_1$-$C_{20}$ alkyl, an unsubstituted or substituted $C_2$-$C_{20}$ alkenyl, an unsubstituted or substituted $C_2$-$C_{20}$ alkynyl, an unsubstituted or substituted $C_3$-$C_8$ cycloalkyl, an unsubstituted or substituted —O—($C_1$-$C_8$ alkyl), an unsubstituted or substituted $C_6$-$C_{40}$ aryl, an unsubstituted or substituted $C_1$-$C_{40}$ heteroaryl, an unsubstituted or substituted $C_2$-$C_{40}$ heterocyclyl and a polar functional group including a hetero atom. In some embodiments, X may be an unsubstituted $C_{2-8}$ alkylene group.

In some embodiments, R may be selected from the group consisting of an unsubstituted or substituted $C_2$-$C_{20}$ alkenyl, an unsubstituted or substituted $C_2$-$C_{20}$ alkynyl, an unsubstituted or substituted aryl, an unsubstituted or substituted heteroaryl, and an unsubstituted or substituted $C_2$-$C_{40}$ partially unsaturated heterocyclyl. In some embodiments, R may be an unsubstituted $C_2$-$C_{20}$ alkenyl, an unsubstituted aryl, or an unsubstituted heteroaryl. In some embodiments, R may be vinyl, allyl, phenyl, ethynyl, propargyl, naphthyl, triazolyl, or thienyl.

In some embodiments, R may be a polar functional group including a hetero atom. In some embodiments, R may be a polar functional group including a hetero atom, where the hetero atom is oxygen, nitrogen, silicon, phosphorus, sulfur, boron, fluorine, chlorine, bromine or iodine. In some embodiments, R may be —F, —Cl, —Br, —I, —CN, —$R^{15}$CN, —C(=O)O$R^{16}$, —OC(=O)$R^{16}$, —O$R^{16}$, —OC(=O) O$R^{16}$, —$R^{15}$OC(=O)O$R^{16}$, —C(=O)$R^{16}$, —$R^{15}$C(=O) $R^{16}$, —OC(=O)$R^{16}$, —$R^{15}$OC(=O)$R^{16}$, —($R^{15}$O)$_k$—

O$R^{16}$, —(O$R^{15}$)$_k$—O$R^{16}$, —C(=O)—O—C(=O)$R^{16}$, —$R^{15}$C(=O)—O—C(=O)$R^{16}$, —S$R^{16}$, —$R^{15}$S$R^{16}$, —SS$R^{16}$, —$R^{15}$SS$R^{16}$, —S(=O)$R^{16}$, —$R^{15}$S(=O)$R^{16}$, —$R^{15}$C(=S)$R^{16}$, —$R^{15}$C(=S)S$R^{16}$, —$R^{15}$SO$_3$$R^{16}$, —SO$_3$$R^{16}$, —NNC(=S)$R^{16}$, —$R^{15}$NNC(=S)$R^{16}$, —$R^{15}$N=C=S, —NCO, —$R^{15}$—NCO, —NO$_2$, —$R^{15}$NO$_2$, —$R^{15}$SO$_2$$R^{16}$, —SO$_2$$R^{16}$,

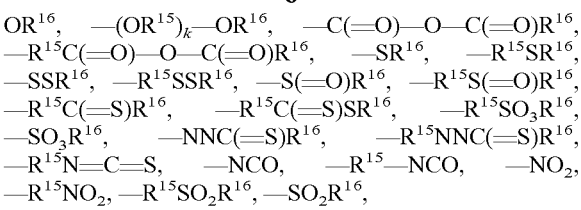

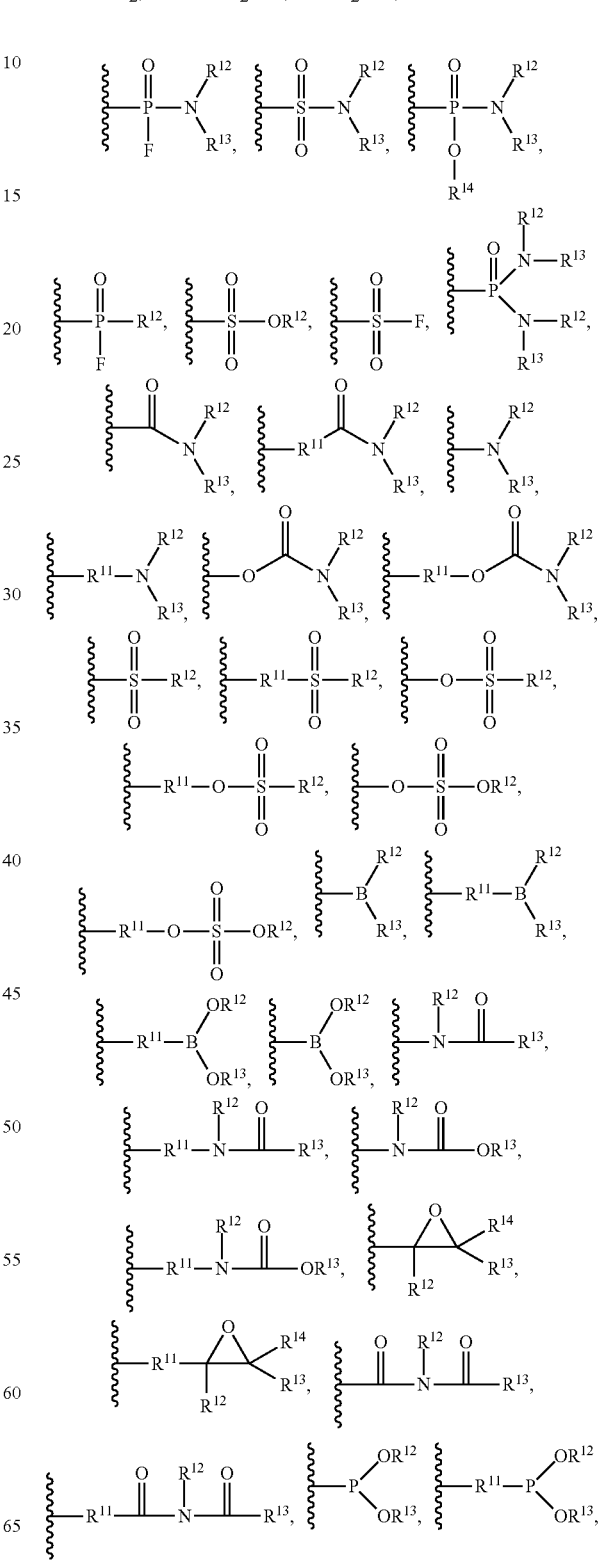

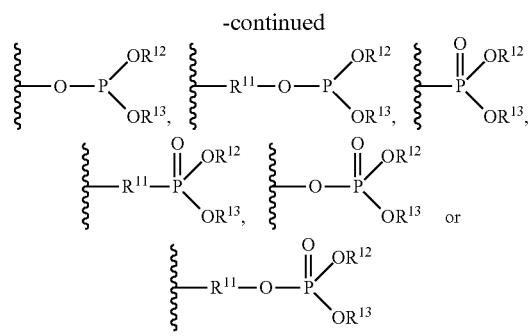

where $R^{11}$ and $R^{15}$ are each independently an unsubstituted or substituted $C_1$-$C_{20}$ alkylene group, an unsubstituted or substituted $C_2$-$C_{20}$ alkenylene group, an unsubstituted or substituted $C_2$-$C_{20}$ alkynylene group, an unsubstituted or substituted $C_3$-$C_{12}$ cycloalkylene group, an unsubstituted or substituted $C_6$-$C_{40}$ arylene group, an unsubstituted or substituted $C_2$-$C_{40}$ heteroarylene group, an unsubstituted or substituted $C_7$-$C_{15}$ alkylarylene group, or an unsubstituted or substituted $C_7$-$C_{15}$ aralkylene aralkyl group, each substituted group in the definition of $R^{11}$ and $R^{15}$ is substituted with at least one halogen atom or cyano group; $R^{12}$, $R^{13}$, $R^{14}$, and $R^{16}$ are each independently a selected from the group consisting of a hydrogen atom, a halogen atom, an unsubstituted or substituted $C_1$-$C_{20}$ alkyl group, an unsubstituted or substituted $C_2$-$C_{20}$ alkenyl group, an unsubstituted or substituted $C_2$-$C_{20}$ alkynyl group, an unsubstituted or substituted $C_3$-$C_{12}$ cycloalkyl group, an unsubstituted or substituted $C_6$-$C_{40}$ aryl group, an unsubstituted or substituted $C_2$-$C_{40}$ heteroaryl group, an unsubstituted or substituted $C_7$-$C_{15}$ alkylaryl group, an unsubstituted or substituted $C_7$-$C_{15}$ trialkylsilyl group, and an unsubstituted or substituted $C_7$-$C_{15}$ aralkyl group, each substituted group in the definition of $R^{12}$, $R^{13}$, $R^{14}$, and $R^{16}$ is substituted with at least one halogen atom or cyano group; and k is an integer of 1 to 20. In some embodiments, R may be —P(OR$^{18}$)(OR$^{19}$), —R$^{17}$P(OR$^{18}$)(OR$^{19}$), —OP(OR$^{18}$)(OR$^{19}$), —R$^{17}$OP(OR$^{18}$)(OR$^{19}$), —P(=O)(OR$^{18}$)(OR$^{19}$), —R$^{17}$P(=O)(OR$^{18}$)(OR$^{19}$), —OP(=O)(OR$^{18}$)(OR$^{19}$), —R$^{17}$OP(=O)(OR$^{18}$)(OR$^{19}$), —R$^{17}$SO$_2$R$^{19}$, and —SO$_2$R$^{19}$; $R^{17}$ is a $C_1$-$C_{10}$ alkylene group unsubstituted or substituted with a halogen atom or a cyano group; and $R^{18}$ and $R^{19}$ are each independently a $C_1$-$C_{10}$ alkyl group unsubstituted or substituted with a halogen atom or a cyano group, a $C_6$-$C_{40}$ aryl group unsubstituted or substituted with a halogen atom or a cyano group, or a $C_1$-$C_{40}$ heteroaryl group unsubstituted or substituted with a halogen atom or a cyano group. In some embodiments, R may be

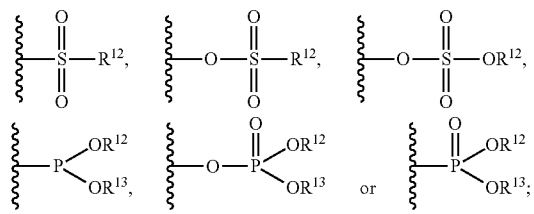

and $R^{12}$ and $R^{13}$ are each independently a selected from the group consisting of an unsubstituted or substituted $C_1$-$C_{20}$ alkyl group, or an unsubstituted or substituted $C_6$-$C_{40}$ aryl, each substituted group in the definition of $R^{12}$ and $R^{13}$ is substituted with at least one halogen atom or cyano group. In some embodiments, R may be

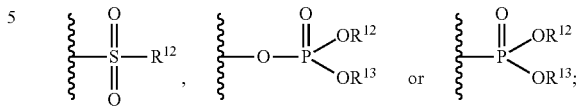

and $R^{12}$ and $R^{13}$ are each independently a selected from the group consisting of methyl, ethyl, propyl, and phenyl. In some embodiments, R may be —P(OR$^{18}$)(OR$^{19}$), —R$^{17}$P(OR$^{18}$)(OR$^{19}$), —OP(OR$^{18}$)(OR$^{19}$), —R$^{17}$OP(OR$^{18}$)(OR$^{19}$), —P(=O)(OR$^{18}$)(OR$^{19}$), —R$^{17}$P(=O)(OR$^{18}$)(OR$^{19}$), —OP(=O)(OR$^{18}$)(OR$^{19}$), —R$^{17}$OP(=O)(OR$^{18}$)(OR$^{19}$), —R$^{17}$SO$_2$R$^{19}$, and —SO$_2$R$^{19}$; $R^{17}$ is a $C_1$-$C_{10}$ alkylene group unsubstituted or substituted with a halogen atom or a cyano group; and $R^{18}$ and $R^{19}$ are each independently a $C_1$-$C_{10}$ alkyl group unsubstituted or substituted with a halogen atom or a cyano group, a $C_6$-$C_{40}$ aryl group unsubstituted or substituted with a halogen atom or a cyano group, or a $C_1$-$C_{40}$ heteroaryl group unsubstituted or substituted with a halogen atom or a cyano group.

In some embodiments, the compound having the structure of Formula 1 may be a compound having the structure of Formula 2:

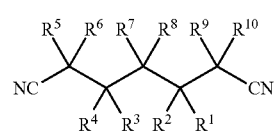

Formula 2 wherein, in Formula 2, $R^1$ to $R^{10}$ may each independently be a hydrogen atom, a halogen atom, —CN, a $C_1$-$C_{10}$ alkyl group unsubstituted or substituted with a halogen atom or a cyano group a $C_2$-$C_{10}$ alkenyl group unsubstituted or substituted with a halogen atom or a cyano group, a $C_2$-$C_{20}$ alkynyl group unsubstituted or substituted with a halogen atom or a cyano group, —P(OR$^{18}$)(OR$^{19}$), —R$^{17}$P(OR$^{18}$)(OR$^{19}$), —OP(OR$^{18}$)(OR$^{19}$), —R$^{17}$OP(OR$^{18}$)(OR$^{19}$), —P(=O)(OR$^{18}$)(OR$^{19}$), —R$^{17}$P(=O)(OR$^{18}$)(OR$^{19}$), —OP(=O)(OR$^{18}$)(OR$^{19}$), —R$^{17}$OP(=O)(OR$^{18}$)(OR$^{19}$), —R$^{17}$SO$_2$R$^{19}$, or —SO$_2$R$^{19}$; $R^{17}$ may be a $C_1$-$C_{10}$ alkylene group unsubstituted or substituted with a halogen atom or a cyano group; $R^{18}$ and $R^{19}$ may each independently be a $C_1$-$C_{10}$ alkyl group unsubstituted or substituted with a halogen atom or a cyano group, a $C_6$-$C_{40}$ aryl group unsubstituted or substituted with a halogen atom or a cyano group, or a $C_1$-$C_{40}$ heteroaryl group unsubstituted or substituted with a halogen atom or a cyano group; at least one of $R^1$ to $R^{10}$ is —CN; and at least one of $R^1$ to $R^{10}$ is a $C_2$-$C_{20}$ alkenyl group unsubstituted or substituted with a halogen atom or a cyano group; a $C_6$-$C_{40}$ aryl group unsubstituted or substituted with a halogen atom or a cyano group, a $C_1$-$C_{40}$ heteroaryl group unsubstituted or substituted with a halogen atom or a cyano group, —P(OR$^{18}$)(OR$^{19}$), —R$^{17}$P(OR$^{18}$)(OR$^{19}$), —OP(OR$^{18}$)(OR$^{19}$), —R$^{17}$OP(OR$^{18}$)(OR$^{19}$), —P(=O)(OR$^{18}$)(OR$^{19}$), —R$^{17}$P(=O)(OR$^{18}$)(OR$^{19}$), —OP(=O)(OR$^{18}$)(OR$^{19}$), —R$^{17}$OP(=O)(OR$^{18}$)(OR$^{19}$), —R$^{17}$SO$_2$R$^{19}$, or —SO$_2$R$^{19}$.

In some embodiments, the compound having the structure of Formula 2 may be a compound having the structure of:

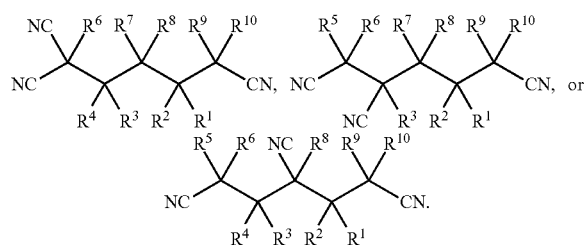

In some embodiments, the compound having the structure of Formula 1 may be a compound having the structure of Formula 13:

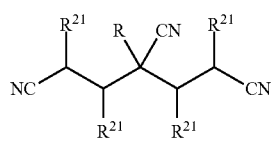

Formula 13 wherein, in Formula 13,

R is selected from the group consisting of an unsubstituted or substituted $C_2$-$C_{20}$ alkenyl, an unsubstituted or substituted $C_2$-$C_{20}$ alkynyl, an unsubstituted or substituted $C_6$-$C_{40}$ aryl, an unsubstituted or substituted $C_1$-$C_{40}$ heteroaryl, and an unsubstituted or substituted $C_2$-$C_{40}$ heterocyclyl, or R is

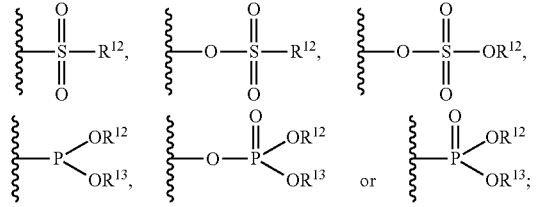

$R^{12}$ and $R^{13}$ are each independently a selected from the group consisting of an unsubstituted or substituted $C_1$-$C_{20}$ alkyl group, or an unsubstituted or substituted $C_6$-$C_{40}$ aryl, each substituted group in the definition of $R^{12}$ and $R^{13}$ is substituted with at least one halogen atom or cyano group; and, each $R^{21}$ is independently selected from the group consisting of hydrogen, an unsubstituted or substituted $C_1$-$C_{20}$ alkyl, an unsubstituted or substituted $C_2$-$C_{20}$ alkenyl, an unsubstituted or substituted $C_2$-$C_{20}$ alkynyl, an unsubstituted or substituted $C_3$-$C_8$ cycloalkyl, an unsubstituted or substituted —O—($C_1$-$C_8$ alkyl), an unsubstituted or substituted $C_6$-$C_{40}$ aryl, an unsubstituted or substituted $C_1$-$C_{40}$ heteroaryl, an unsubstituted or substituted $C_2$-$C_{40}$ heterocyclyl and a polar functional group including a hetero atom. In some embodiments, R may be

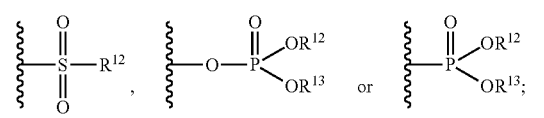

and $R^{12}$ and $R^{13}$ may each independently be a selected from the group consisting of methyl, ethyl propyl, and phenyl. In some embodiments, R may be vinyl, allyl, phenyl, ethynyl, propargyl, naphthyl, triazolyl, or thienyl.

In some embodiments, the compound having the structure of Formula 1 may be a compound having the structure of one of Formulae 3 to 12:

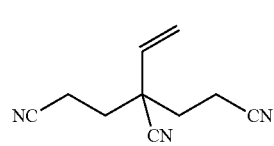

Formula 3

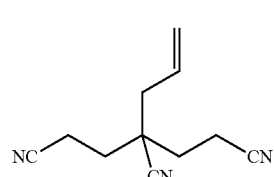

Formula 4

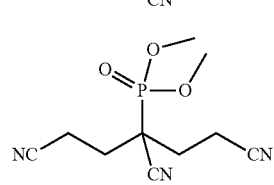

Formula 5

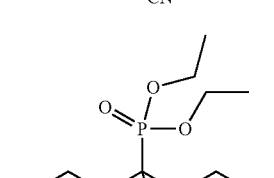

Formula 6

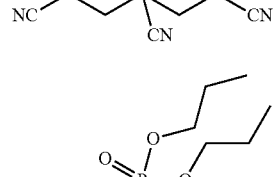

Formula 7

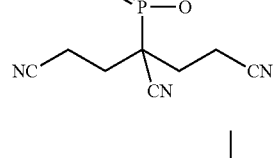

Formula 8

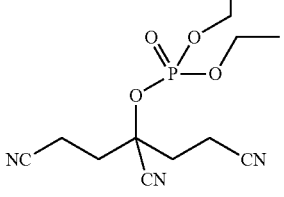

Formula 9

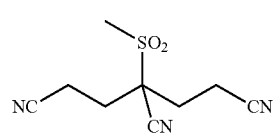

Formula 10

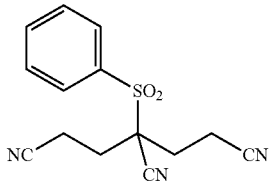

-continued

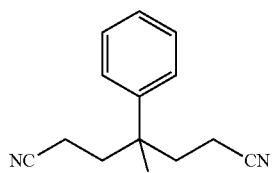

Formula 11

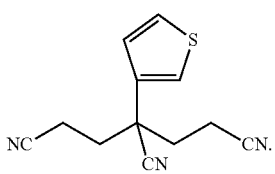

Formula 12

Some embodiments provide an electrolyte, comprising: a lithium salt; a non-aqueous organic solvent; and an additive as disclosed and described herein. In some embodiments, the additive may be a compound of any one of Formulae 1-13. In some embodiments, the additive is present in an amount of from about 0.1 wt % to about 10 wt % based on total weight of the electrolyte. In some embodiments, the concentration of the lithium salt in the electrolyte is from about 0.01 M to about 2.0 M.

Some embodiments provide a rechargeable lithium battery including: a negative electrode; a positive electrode; and an electrolyte as disclosed and described herein. In some embodiments, the negative electrode includes graphite. In some embodiments, the operating voltage is about 3.8V or greater. In some embodiments, the electrolyte includes a compound of any one of Formulae 1-13.

Hereinafter, an exemplary mechanism of improving performance of a lithium battery by adding the compound used as an additive in an electrolytic solution will be described in greater detail. This is for the purpose of better understanding of the present embodiments and is not intended to limit the scope of the invention.

During charging process, nitrile groups in the compound may be oxidized themselves by providing their electrons onto a surface of a positive electrode, or may react with other already oxidized polar solvent molecules, thereby affecting characteristics of a protection layer formed on a surface of the positive electrode. The compound may provide electrons more efficiently to the positive electrode than a polar solvent. That is, the compound may be oxidized at a lower voltage than a polar solvent, and be oxidized before the polar solvent is oxidized.

For example, the compound of Formula 1 including the nitrile groups may be more apt to be oxidized or decomposed into radicals and/or ions during charging than a polar solvent. Consequently, the radicals and/or ions may bind with transition metal ions released onto a surface of the positive electrode to form an insoluble compound on the surface, or may further react with a solvent to form additional insoluble compound. The radicals and/or ions may also form a complex on the surface of the positive reaction by a reaction with various transition metal ions on the surface of the positive electrode. For example, cyano ions (CN) released from the compound of Formula 1 including a trinitrile group may form a complex with transition metal ions from a positive active material. This complex may form a modified protection layer with improved stability that is more durable after charging and discharging for a long time than a protection layer formed from decomposition of an organic solvent. The stable modified protection layer may more effectively block co-intercalation of the organic solvent solvating the lithium ions during intercalation of the lithium ions into the electrode. Accordingly, the modified protection layer may more effectively block direct contact between the organic solvent and the positive electrode to further improve reversibility of lithium intercalation and deintercalation, and consequently improve stability and lifetime characteristics of the battery.

The unsaturated functional group or polar functional group in the compound of Formula 1 may be reduced by itself by accepting electrons from a surface of the negative electrode during charging or may react with polar solvent molecules in reduced form, thus affecting characteristics of a solid electrolyte interface (SEI) on the surface of the negative electrode. The compound of Formula 1 including the unsaturated functional group or polar functional group may more effectively accept electrons from a negative electrode than a polar solvent. That is, a compound of Formula 1 may be reduced at a lower voltage than the polar solvent is reduced.

For example, because of including the unsaturated functional group or polar functional group, the compound of Formula 1 may be more apt to be oxidized or decomposed into radicals and/or ions during charging. Consequently, the radicals and/or ions may be more likely to bind with lithium ions to form an insoluble compound precipitated on the surface of the negative electrode, or may be likely to react with a solvent to form an additional insoluble compound. These insoluble compounds may form a covalent bond or be adsorbed onto a surface of the negative electrode via reaction with various functional groups on the surface of a carbonaceous negative electrode or with the carbonaceous negative electrode itself. This bonding and/or adsorption may lead to formation of a modified SEI with improved stability that is more durable after charging and discharging for a long time than an SEI formed from only an organic solvent. The stable modified SEI may more effectively block co-intercalation the organic solvent solvating the lithium ions during intercalation of the lithium ions into the electrode. Accordingly, the modified SEI may more effectively block direct contact between the organic solvent and the negative electrode to further improve reversibility of lithium intercalation and deintercalation, and consequently improve stability and lifetime characteristics of the battery.

In other words, since the compound of Formula 1 includes a nitrile group that may be reactive with a surface of the positive electrode, and a unsaturated functional group and/or polar functional group that may be reactive with a surface of the negative electrode, it may form a protection layer on the surface of the positive electrode and an SEI on the surface of the negative electrode, and thus may improve lifetime characteristics of a lithium battery. In some embodiments, the additives as disclosed and described herein may provide improved charge capacity and lifetime characteristics in a lithium battery by way of a different mechanism from the exemplary mechanism or only certain processes described under the exemplary mechanism.

In some embodiments, the saturated nonpolar functional group in the compound of Formula 1 may be a hydrogen atom, a $C_1$-$C_{20}$ linear or branched alkyl group, or a $C_3$-$C_{12}$ cycloalkyl group, and in some embodiments, may be a hydrogen atom, a methyl group, an ethyl group, a propyl group, or a butyl group.

In some embodiments, the unsaturated functional group in the compound of Formula 1 may be a $C_2$-$C_{20}$ alkenyl group unsubstituted or substituted with a halogen atom or a cyano group; a $C_2$-$C_{20}$ alkynyl group unsubstituted or substituted with a halogen atom or a cyano group; a $C_6$-$C_{40}$ aryl group unsubstituted or substituted with a halogen atom or a cyano group; or a $C_1$-$C_{40}$ heteroaryl group unsubstituted or substituted with a halogen atom or a cyano group, and in some embodiments, may be a vinyl group, an acetylene group, a phenyl group, a naphthyl group, a thiophenyl group, or a triazolyl group.

In some embodiments, the polar functional group in the compound of Formula 1 may include at least one hetero atom selected from the group consisting of oxygen, nitrogen, phosphorous, silicon, and boron.

For example, the polar functional group in the compound of Formula 1 may include at least one selected from the group consisting of —F, —Cl, —Br, —I, —CN, —$R^{15}$CN, —C(=O)O$R^{16}$, —OC(=O)$R^{16}$, —O$R^{16}$, —OC(=O) O$R^{16}$, —$R^{15}$OC(=O)O$R^{16}$, —C(=O)$R^{16}$, —$R^{15}$C(=O) $R^{16}$, —OC(=O)$R^{16}$, —$R^{15}$OC(=O)$R^{16}$, —($R^{15}$O)$_k$— O$R^{16}$, —(O$R^{15}$)$_k$—O$R^{16}$, —C(=O)—O—C(=O)$R^{16}$, —$R^{15}$C(=O)—O—C(=O)$R^{16}$, —S$R^{16}$, —$R^{15}$S$R^{16}$, —SS$R^{16}$, —$R^{15}$SS$R^{16}$, —S(=O)$R^{16}$, —$R^{15}$S(=O)$R^{16}$, —$R^{15}$C(=S)$R^{16}$, —$R^{15}$C(=S)S$R^{16}$, —$R^{15}$SO$_3$$R^{16}$, —SO$_3$$R^{16}$, —NNC(=S)$R^{16}$, —$R^{15}$NNC(=S)$R^{16}$, —$R^{15}$N=C=S, —NCO, —$R^{15}$—NCO, —NO$_2$, —$R^{15}$NO$_2$, —$R^{15}$SO$_2$$R^{16}$, —SO$_2$$R^{16}$,

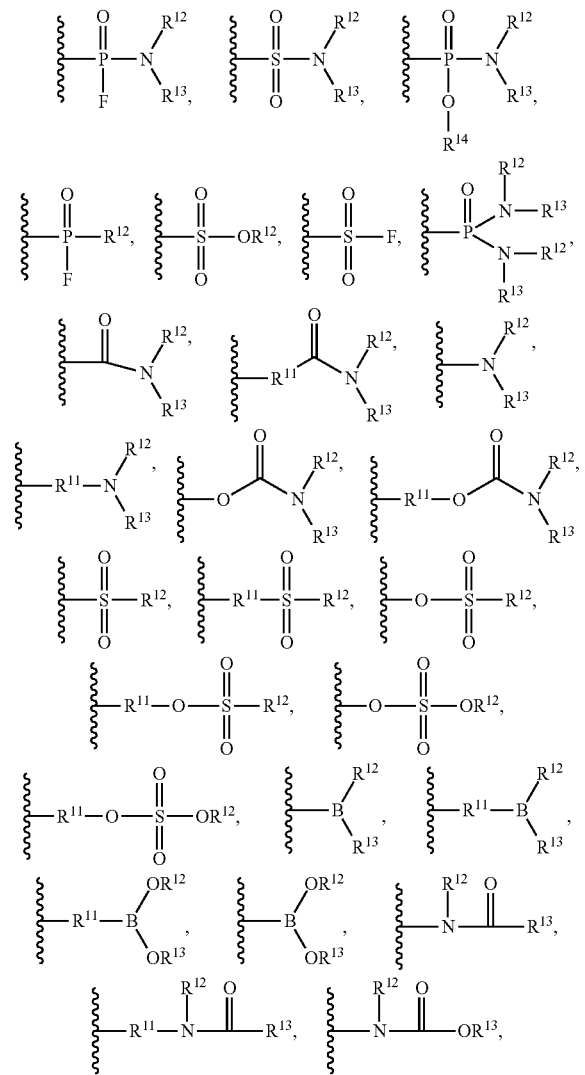

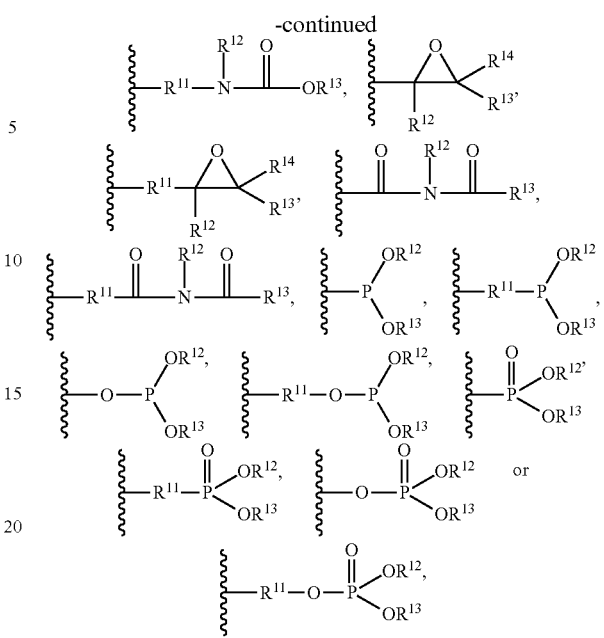

wherein $R^{11}$ and $R^{15}$ are each independently a $C_{1-20}$ alkylene group unsubstituted or substituted with a halogen atom or a cyano group, a $C_{2-20}$ alkenylene group unsubstituted or substituted with a halogen atom or a cyano group, a $C_{2-20}$ alkynylene group unsubstituted or substituted with a halogen atom or a cyano group, a $C_{3-12}$ cycloalkylene group unsubstituted or substituted with a halogen atom or a cyano group, a $C_{6-40}$ arylene group unsubstituted or substituted with a halogen atom or a cyano group, a $C_{2-40}$ heteroarylene group unsubstituted or substituted with a halogen atom or a cyano group, a $C_{7-15}$ alkylarylene group unsubstituted or substituted with a halogen atom or a cyano group, or a $C_{7-15}$ aralkylene aralkyl group unsubstituted or substituted with a halogen atom or a cyano group;

$R^{12}$, $R^{13}$, $R^{14}$, and $R^{16}$ may be each independently a hydrogen atom, a halogen atom, a $C_{1-20}$ alkyl group unsubstituted or substituted with a halogen atom or a cyano group, a $C_{2-20}$ alkenyl group unsubstituted or substituted with a halogen atom or a cyano group; a $C_{2-20}$ alkynyl group unsubstituted or substituted with a halogen atom or a cyano group; a $C_{3-12}$ cycloalkyl group unsubstituted or substituted with a halogen atom or a cyano group; a $C_{6-40}$ aryl group unsubstituted or substituted with a halogen atom or a cyano group; a $C_{2-40}$ heteroaryl group unsubstituted or substituted with a halogen atom or a cyano group; a $C_{7-15}$ alkylaryl group unsubstituted or substituted with a halogen atom or a cyano group, a $C_{7-15}$ trialkylsilyl group unsubstituted or substituted with a halogen atom or a cyano group, or a $C_{7-15}$ aralkyl group unsubstituted or substituted with a halogen atom or a cyano group; and k may be an integer of 1 to 20.

For example, in the polar functional group of the compound of Formula 1, the halogen atom substituted in an alkylene group, an alkenylene group, an alkynylene group, a cycloalkylene group, an arylene group, a heteroarylene group, an alkylarylene group, an aralkylene group, an alkyl group, an alkenyl group, an alkynyl, a cycloalkyl group, an aryl group, a heteroaryl group, an alkylaryl group, a trialkylsilyl group, or an aralkyl group may be fluorine (F).

For example, the polar functional group in the compound of Formula 1 may include at least one selected from the group consisting of —P(O$R^{18}$)(O$R^{19}$), —$R^{17}$P(O$R^{18}$)(O$R^{19}$), —OP(OR$^{18}$)(OR$^{19}$), —R$^{17}$OP(OR$^{18}$)(OR$^{19}$), —P(=O)(OR$^{18}$)(OR$^{19}$), —R$^{17}$P(=O)(OR$^{18}$)(OR$^{19}$), —OP(=O)(OR$^{18}$)(OR$^{19}$), —R$^{17}$OP(=O)(OR$^{18}$)(OR$^{19}$), —R$^{17}$SO$_2$R$^{19}$, and —SO$_2$R$^{19}$, wherein R$^{17}$ may be a C$_{1-10}$ alkylene group unsubstituted or substituted with a halogen atom or a cyano group; R$^{18}$ and R$^{19}$ may be each independently a C$_{1-10}$ alkyl group unsubstituted or substituted with a halogen atom or a cyano group, a C$_{6-40}$ aryl group unsubstituted or substituted with a halogen atom or a cyano group, or a C$_{1-40}$ heteroaryl group unsubstituted or substituted with a halogen atom or a cyano group.

In some embodiments, the compound of Formula 1 may be a compound represented by Formula 2 below:

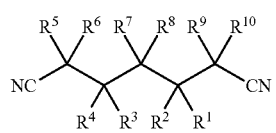

Formula 2

In Formula 2, R$^1$ to R$^{10}$ may be each independently a hydrogen atom, a halogen atom, —CN, a C$_{1-10}$ alkyl group unsubstituted or substituted with a halogen atom or a cyano group a C$_{2-10}$ alkenyl group unsubstituted or substituted with a halogen atom or a cyano group, a C$_{2-20}$ alkynyl group unsubstituted or substituted with a halogen atom or a cyano group, —P(OR$^{18}$)(OR$^{19}$), —R$^{17}$P(OR$^{18}$)(OR$^{19}$), —OP(OR$^{18}$)(OR$^{19}$), —R$^{17}$OP(OR$^{18}$)(OR$^{19}$), —P(=O)(OR$^{18}$)(OR$^{19}$), —R$^{17}$P(=O)(OR$^{18}$)(OR$^{19}$), —OP(=O)(OR$^{18}$)(OR$^{19}$), —R$^{17}$OP(=O)(OR$^{18}$)(OR$^{19}$), —R$^{17}$SO$_2$R$^{19}$, or —SO$_2$R$^{19}$;

R$^{17}$ may be a C$_{1-10}$ alkylene group unsubstituted or substituted with a halogen atom or a cyano group; R$^{18}$ and R$^{19}$ may be each independently a C$_{1-10}$ alkyl group unsubstituted or substituted with a halogen atom or a cyano group, a C$_{6-40}$ aryl group unsubstituted or substituted with a halogen atom or a cyano group, or a C$_{1-40}$ heteroaryl group unsubstituted or substituted with a halogen atom or a cyano group;

at least one of R$^1$ to R$^{10}$ may be —CN; and at least one of R$^1$ to R$^{10}$ may be a C$_{2-20}$ alkenyl group unsubstituted or substituted with a halogen atom or a cyano group; a C$_{6-40}$ aryl group unsubstituted or substituted with a halogen atom or a cyano group, a C$_{1-40}$ heteroaryl group unsubstituted or substituted with a halogen atom or a cyano group, —P(OR$^{18}$)(OR$^{19}$), —R$^{17}$P(OR$^{18}$)(OR$^{19}$), —OP(OR$^{18}$)(OR$^{19}$), —R$^{17}$OP(OR$^{18}$)(OR$^{19}$), —P(=O)(OR$^{18}$)(OR$^{19}$), —R$^{17}$P(=O)(OR$^{18}$)(OR$^{19}$), —OP(=O)(OR$^{18}$)(OR$^{19}$), —R$^{17}$OP(=O)(OR$^{18}$)(OR$^{19}$), —R$^{17}$SO$_2$R$^{19}$, or —SO$_2$R$^{19}$.

For example, at least one of R$^1$ to R$^{10}$ in Formula 2 may be —CN, and at least one of the remaining R$^1$ to R$^{10}$ may be —CH=CH$_2$, —CH$_2$CH=CH$_2$, —CH$_2$CH$_2$CH=CH$_2$, —P(OCH$_3$)(OCH$_3$), —CH$_2$P(OCH$_3$)(OCH$_3$), —OP(OCH$_3$)(OCH$_3$), —CH$_2$OP(OCH$_3$)(OCH$_3$), —P(=O)(OCH$_3$)(OCH$_3$), —CH$_2$P(=O)(OCH$_3$)(OCH$_3$), —P(OCH$_2$CH$_3$)(OCH$_2$CH$_3$), —OP(=O)(OCH$_2$CH$_3$)(OCH$_2$CH$_3$), —CH$_2$OP(=O)(OCH$_2$CH$_3$)(OCH$_2$CH$_3$), —P(OCH$_2$CH$_3$)(OCH$_2$CH$_3$), —CH$_2$P(OCH$_2$CH$_3$)(OCH$_2$CH$_3$), —OP(OCH$_2$CH$_2$CH$_3$)(OCH$_2$CH$_2$CH$_3$), —CH$_2$OP(OCH$_2$CH$_2$CH$_3$)(OCH$_2$CH$_2$CH$_3$), —P(=O)(OCH$_2$CH$_2$CH$_3$)(OCH$_2$CH$_2$CH$_3$), —CH$_2$P(=O)(OCH$_2$CH$_2$CH$_3$)(OCH$_2$CH$_2$CH$_3$), —OP(=O)(OCH$_2$CH$_2$CH$_3$)(OCH$_2$CH$_2$CH$_3$), —CH$_2$OP(=O)(OCH$_2$CH$_2$CH$_3$)(OCH$_2$CH$_2$CH$_3$), —C$_6$H$_5$, —C$_4$H$_3$S, —CH$_2$SO$_2$CH$_3$, —CH$_2$SO$_2$CH$_2$CH$_3$, —CH$_2$SO$_2$CH$_2$CH$_2$CH$_3$, —SO$_2$CH$_3$, —SO$_2$CH$_2$CH$_3$, —SO$_2$CH$_2$CH$_2$CH$_3$, —SO$_2$C$_6$H$_5$, —SO$_2$C$_{10}$H$_7$, or SO$_2$C$_4$H$_3$S.

In some other embodiments, the compound of Formula 1 above may be a compound represented by one of Formulae 3 to 12 below:

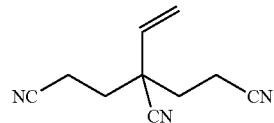

Formula 3

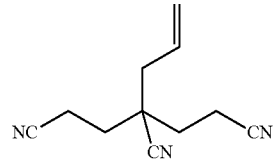

Formula 4

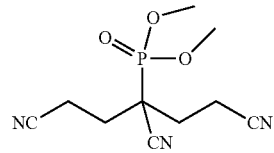

Formula 5

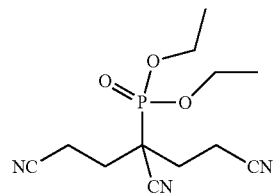

Formula 6

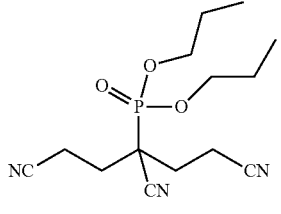

Formula 7

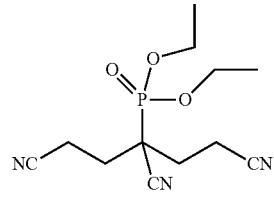

Formula 8

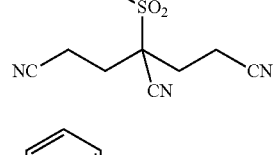

Formula 9

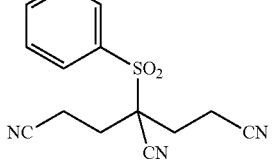

Formula 10

-continued

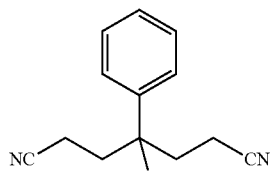

Formula 11

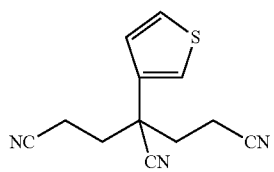

Formula 12

According to another embodiment of the present invention, an organic electrolytic solution includes a lithium salt, an organic solvent, and any of the compounds of Formula 1 according to the above-described embodiments as an additive.

An amount of the compound of Formula 1 used as an additive in the organic electrolyte solution may be from about 0.1 wt % to about 10 wt % based on a total weight of the organic electrolytic solution, but is not limited thereto. In some embodiments, the amount of the compound of Formula 1 may be appropriately varied when needed. For example, the amount of the compound in the organic electrolytic solution may be from about 0.1 wt % to about 7 wt %, and in some embodiments, from about 0.1 wt % to about 5 wt %, and in some other embodiments, from about 0.2 wt % to about 5 wt %, and in still other embodiments, from about 0.5 wt % to about 5 wt %, and in yet still other embodiments, from about 1 wt % to about 5 wt %, each based on the total weight of the organic electrolyte solution. When the amount of the compound is within these ranges, a lithium battery with further improved characteristics may be obtained.

In some embodiments, the organic solvent of the organic electrolytic solution may include a solvent having a boiling point of about 200° C. or less at about 25° C. at atmospheric pressure.

In some embodiments, the organic solvent may include at least one selected from the group consisting of dialkylcarbonate, a cyclic carbonate, a linear or cyclic ether, a linear or cyclic amide, an aliphatic nitrile, a linear or cyclic ether, and a derivative thereof.

For example, the organic solvent may include at least one selected from the group consisting of dimethylcarbonate (DMC), ethylmethylcarbonate (EMC), methylpropylcarbonate, ethylpropylcarbonate, diethylcarbonate (DEC), dipropylcarbonate, propylenecarbonate (PC), ethylenecarbonate (EC), fluoroethylenecarbonate (FEC), butylenecarbonate, ethylpropionate, ethylbutyrate, acetonitrile, succinonitrile (SN), dimethylsulfoxide, dimethylformamide, dimethylacetamide, γ-valerolactone, γ-butyrolactone, and tetrahydrofuran, but is not limited thereto. Any low-boiling point solvent available in the art may be used.

In some embodiments, a concentration of the lithium salt in the organic electrolytic solution may be from about 0.01 M to about 2.0 M, but is not limited thereto. The concentration of the lithium salt may be appropriately varied if needed. When the concentration of the lithium salt is within these ranges, a lithium battery with improved characteristics may be obtained.

The lithium salt of the organic electrolytic solution is not specifically limited. Any lithium salt available in the art may be used. Non-limiting examples of the lithium salt are $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (where x and y are an integer from 1 to 20), LiCl, LiI, or a mixture thereof.

In some embodiments, the organic electrolytic solution may be in a liquid or gel state. For example, the organic electrolytic solution may be prepared by adding a lithium salt and any of the above-mentioned additives in an organic solvent as described above.

Some embodiments provide a lithium battery includes a positive electrode, a negative electrode, and any of the organic electrolytic solutions according to the above-described embodiments. The lithium battery is not specifically limited in shape. For example, the lithium battery may be a lithium secondary battery, such as a lithium ion battery, a lithium ion polymer battery, a lithium sulfur battery, or a lithium primary battery.

In some embodiments, the negative electrode of the lithium battery may include graphite. In some embodiments, the lithium battery may have a high operating voltage of about 4.8V or greater.

In some embodiments, the lithium battery may be manufactured in the following manner.

First, a positive electrode is prepared.

For example, a positive active material, a conducting agent, a binder, and a solvent are mixed to prepare a positive active material composition. In some embodiments, the positive active material composition may be directly coated on a metallic current collector to prepare a positive electrode plate. In some embodiments, the positive active material composition may be cast on a separate support to form a positive active material film, which may then be separated from the support and laminated on a metallic current collector to prepare a positive electrode plate. The positive electrode is not limited to the examples described above, and may be one of a variety of types.

The positive active material may be any one available in the art. In some embodiments, may be a lithium-containing metal oxide. In some embodiments, the positive active material may be at least one of a composite oxide of lithium with a metal selected from among Co, Mn, Ni, and a combination thereof. In some embodiments, the positive active material may be a compound represented by one of the following formulae:

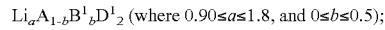
$Li_aA_{1-b}B^1{}_bD^1{}_2$ (where 0.90≤a≤1.8, and 0≤b≤0.5);

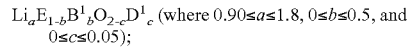
$Li_aE_{1-b}B^1{}_bO_{2-c}D^1{}_c$ (where 0.90≤a≤1.8, 0≤b≤0.5, and 0≤c≤0.05);

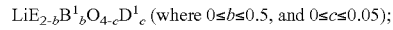
$LiE_{2-b}B^1{}_bO_{4-c}D^1{}_c$ (where 0≤b≤0.5, and 0≤c≤0.05);

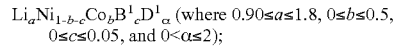
$Li_aNi_{1-b-c}Co_bB^1{}_cD^1{}_\alpha$ (where 0.90≤a≤1.8, 0≤b≤0.5, 0≤c≤0.05, and 0<α≤2);

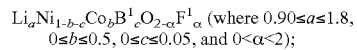
$Li_aNi_{1-b-c}Co_bB^1{}_cO_{2-\alpha}F^1{}_\alpha$ (where 0.90≤a≤1.8, 0≤b≤0.5, 0≤c≤0.05, and 0<α<2);

$Li_aNi_{1-b-c}Co_bB^1{}_cO_{2-\alpha}F^1{}_2$ (where 0.90≤a≤1.8, 0≤b≤0.5, 0≤c≤0.05, and 0<α<2);

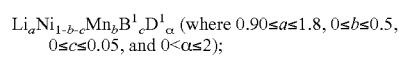
$Li_aNi_{1-b-c}Mn_bB^1{}_cD^1{}_\alpha$ (where 0.90≤a≤1.8, 0≤b≤0.5, 0≤c≤0.05, and 0<α≤2);

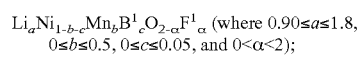
$Li_aNi_{1-b-c}Mn_bB^1{}_cO_{2-\alpha}F^1{}_\alpha$ (where 0.90≤a≤1.8, 0≤b≤0.5, 0≤c≤0.05, and 0<α<2);

$Li_aNi_{1-b-c}Mn_bB_cO_{2-\alpha}F^1_2$ (where $0.90 \le a \le 1.8$, $0 \le b \le 0.5$, $0 \le c \le 0.05$, and $0 < \alpha < 2$);

$Li_aNi_bE_cG_dO_2$ (where $0.90 \le a \le 1.8$, $0 \le b \le 0.9$, $0 \le c \le 0.5$, and $0.001 \le d \le 0.1.$);

$Li_aNi_bCo_cMn_dGeO_2$ (where $0.90 \le a \le 1.8$, $0 \le b \le 0.9$, $0 \le c \le 0.5$, $0 \le d \le 0.5$, and $0.001 \le e \le 0.1.$);

$Li_aNiG_bO_2$ (where $0.90 \le a \le 1.8$, and $0.001 \le b \le 0.1.$);

$Li_aCoG_bO_2$ (where $0.90 \le a \le 1.8$, and $0.001 \le b \le 0.1.$);

$Li_aMnG_bO_2$ (where $0.90 \le a \le 1.8$, and $0.001 \le b \le 0.1.$);

$Li_aMn_2G_bO_4$ (where $0.90 \le a \le 1.8$, and $0.001 \le b \le 0.1.$); $QO_2; QS_2; LiQS_2; V_2O_5; LiV_2O_5; LiI^1O_2; LiNiVO_4;$ $Li_{(3-f)}J_2(PO_4)_3 (0 \le f \le 2); Li_{(3-f)}Fe_2(PO_4)_3 (0 \le f \le 2);$ and $LiFePO_4.$ In the formulae above, A may be selected from the group consisting of nickel (Ni), cobalt (Co), manganese (Mn), and combinations thereof; $B^1$ may be selected from the group consisting of aluminum (Al), nickel (Ni), cobalt (Co), manganese (Mn), chromium (Cr), iron (Fe), magnesium (Mg), strontium (Sr), vanadium (V), a rare earth element, and combinations thereof; $D^1$ may be selected from the group consisting of oxygen (O), fluorine (F), sulfur (S), phosphorus (P), and combinations thereof; E may be selected from the group consisting of cobalt (Co), manganese (Mn), and combinations thereof; $F^1$ may be selected from the group consisting of fluorine (F), sulfur (S), phosphorus (P), and combinations thereof; G may be selected from the group consisting of aluminum (Al), chromium (Cr), manganese (Mn), iron (Fe), magnesium (Mg), lanthanum (La), cerium (Ce), strontium (Sr), vanadium (V), and combinations thereof; Q is selected from the group consisting of titanium (Ti), molybdenum (Mo), manganese (Mn), and combinations thereof; $I^1$ is selected from the group consisting of chromium (Cr), vanadium (V), iron (Fe), scandium (Sc), yttrium (Y), and combinations thereof; and J may be selected from the group consisting of vanadium (V), chromium (Cr), manganese (Mn), cobalt (Co), nickel (Ni), copper (Cu), and combinations thereof.

For example, the positive active material may be $LiCoO_2$, $LiMn_xO_{2x}$ (x=1, 2), $LiNi_{1-x}Mn_xO_{2x}$ (where $0 < x < 1$), $LiNi_{1-x-y}Co_xMn_yO_2$ (where $0 \le x \le 0.5$ and $0 \le y \le 0.5$), or $LiFePO_4$.

The compounds listed above as positive active materials may have a surface coating layer (hereinafter, "coating layer"). Alternatively, a mixture of a compound without a coating layer and a compound having a coating layer, the compounds being selected from the compounds listed above, may be used. In some embodiments, the coating layer may include at least one compound of a coating element selected from the group consisting of oxide, hydroxide, oxyhydroxide, oxycarbonate, and hydroxycarbonate of the coating element. In some embodiments, the compounds for the coating layer may be amorphous or crystalline. In some embodiments, the coating element for the coating layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or mixtures thereof. In some embodiments, the coating layer may be formed using any method that does not adversely affect the physical properties of the positive active material when a compound of the coating element is used. For example, the coating layer may be formed using a spray coating method, a dipping method, or the like. This is obvious to those of skill in the art, and thus a detailed description thereof will be omitted.

In some embodiments, the conducting agent may be carbon black or graphite particulates, but is not limited thereto. Any material available as a conducting agent in the art may be used.

Examples of the binder are a vinylidene fluoride/hexafluoropropylene copolymer, polyvinylidene fluoride (PVDF), polyacrylonitrile, polymethylmethacrylate, polytetrafluoroethylene, mixtures thereof, and a styrene butadiene rubber polymer, but are not limited thereto. Any material available as a binding agent in the art may be used.

Non-limiting examples of the solvent are N-methyl-pyrrolidone, acetone, and water. Any material available as a solvent in the art may be used.

The amounts of the positive active material, the conducting agent, the binder, and the solvent may be in ranges that are commonly used in lithium batteries. At least one of the conducting agent, the binder and the solvent may not be used according to the use and the structure of the lithium battery.

Next, a negative electrode is prepared.

For example, a negative active material, a conducting agent, a binder, and a solvent are mixed to prepare a negative active material composition. In some embodiments, the negative active material composition may be directly coated on a metallic current collector and dried to prepare a negative electrode plate. In some embodiments, the negative active material composition may be cast on a separate support to form a negative active material film, which may then be separated from the support and laminated on a metallic current collector to prepare a negative electrode plate.

In some embodiments, the negative active material may be any negative active material for a lithium battery available in the art. For example, the negative active material may include at least one selected from the group consisting of lithium metal, a metal that is alloyable with lithium, a transition metal oxide, a non-transition metal oxide, and a carbonaceous material.

Examples of the metal alloyable with lithium are Si, Sn, Al, Ge, Pb, Bi, Sb, a Si—Y alloy (where Y is an alkali metal, an alkali earth metal, a Group XIII element, a Group XIV element, a transition metal, a rare earth element, or a combination thereof except for Si), and a Sn—Y alloy (where Y is an alkali metal, an alkali earth metal, a Group XIII element, a Group XIV element, a transition metal, a rare earth element, or a combination thereof except for Sn). In some embodiments, Y may be magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), titanium (Ti), germanium (Ge), phosphorus (P), arsenic (As), antimony (Sb), bismuth (Bi), sulfur (S), selenium (Se), tellurium (Te), polonium (Po), or combinations thereof. In some embodiments, Y may be magnesium (Mg), calcium (Ca), strontium (Sr), barium (Ba), radium (Ra), scandium (Sc), yttrium (Y), titanium (Ti), zirconium (Zr), chromium (Cr), molybdenum (Mo), tungsten (W), iron (Fe), lead (Pb), ruthenium (Ru), osmium (Os), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), germanium (Ge), phosphorus (P), arsenic (As), antimony (Sb), bismuth (Bi), sulfur (S), selenium (Se), or tellurium (Te).

Non-limiting examples of the transition metal oxide are a lithium titanium oxide, a vanadium oxide, and a lithium vanadium oxide.

Non-limiting examples of the non-transition metal oxide are $SnO_2$ and $SiO_x$ (0<x<2).

Examples of the carbonaceous material are crystalline carbon, amorphous carbon, and mixtures thereof. Examples of the crystalline carbon are graphite, such as natural graphite or artificial graphite that are in amorphous, plate, flake, spherical or fibrous form. Examples of the amorphous carbon are soft carbon (carbon sintered at low temperatures), hard carbon, meso-phase pitch carbides, sintered corks, and the like.

In some embodiments, the conducting agent, the binder and the solvent used for the negative active material composition may be the same as those used for the positive active material composition.

The amounts of the negative active material, the conducting agent, the binder, and the solvent are those levels generally used in lithium batteries. At least one of the conducting agent, the binder and the solvent may not be used according to the use and the structure of the lithium battery.

Next, a separator to be disposed between the positive electrode and the negative electrode is prepared.

The separator for the lithium battery may be any separator that is commonly used in lithium batteries. In some embodiments, the separator may have low resistance to migration of ions in an electrolyte and have an excellent electrolyte-retaining ability. Examples of the separator are glass fiber, polyester, Teflon, polyethylene, polypropylene, polytetrafluoroethylene (PTFE), and a combination thereof, each of which may be a non-woven or woven fabric. For example, a rollable separator including polyethylene or polypropylene may be used for a lithium ion battery. A separator with a good organic electrolytic solution-retaining ability may be used for a lithium ion polymer battery. For example, the separator may be manufactured in the following manner.

In some embodiments, a polymer resin, a filler, and a solvent may be mixed together to prepare a separator composition. Then, the separator composition may be directly coated on an electrode, and then dried to form the separator. In some embodiments, the separator composition may be cast on a support and then dried to form a separator film, which may then be separated from the support and laminated on an electrode to form the separator.

The polymer resin used to manufacture the separator may be any material that is commonly used as a binder for electrode plates. Examples of the polymer resin are a vinylidenefluoride/hexafluoropropylene copolymer, polyvinylidene fluoride (PVDF), polyacrylonitrile, polymethylmethacrylate and a mixture thereof.

Next, an organic electrolyte solution as described above is prepared.

Figure 3:
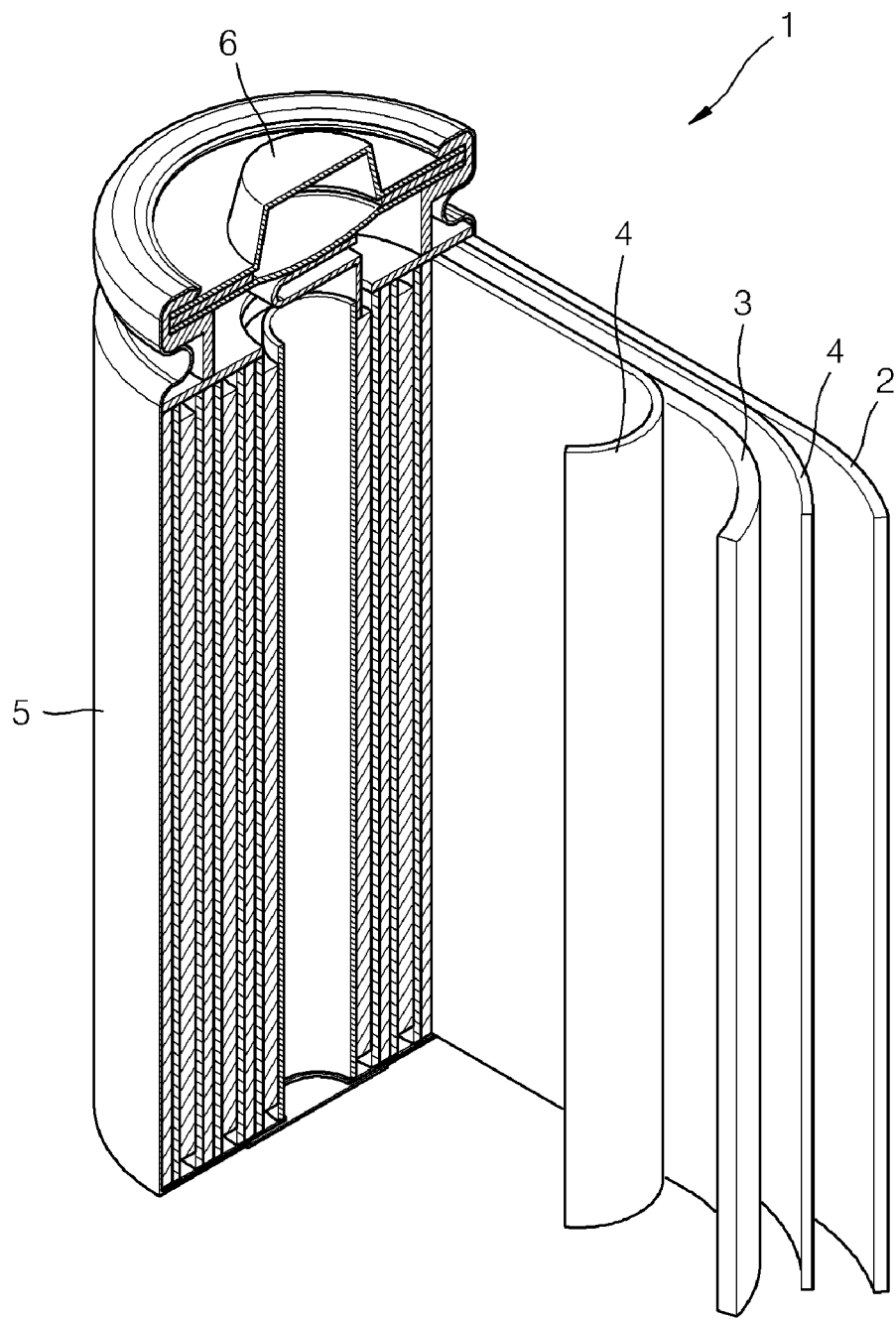
FIG. 3 is a schematic view of a lithium battery according to an embodiment of the present invention.

Referring to FIG. 3, a lithium battery 1 includes a positive electrode 3, a negative electrode 2, and a separator 4. In some embodiments, the positive electrode 3, the negative electrode 2 and the separator 4 may be wound or folded, and then sealed in a battery case 5. In some embodiments, the battery case 5 may be filled with an organic electrolytic solution and sealed with a cap assembly 6, thereby completing the manufacture of the lithium battery 1. In some embodiments, the battery case 5 may be a cylindrical type, a rectangular type, or a thin-film type. For example, the lithium battery may be a thin-film type battery. In some embodiments, the lithium battery may be a lithium ion battery.

In some embodiments, the separator may be interposed between the positive electrode and the negative electrode to form a battery assembly. In some embodiments, the battery assembly may be stacked in a bi-cell structure and impregnated with the electrolytic solution. In some embodiments, the resultant assembly may be put into a pouch and hermetically sealed, thereby completing the manufacture of a lithium ion polymer battery.

In some embodiments, a plurality of battery assemblies may be stacked to form a battery pack, which may be used in any device that operates at high temperatures and requires high output, for example, in a laptop computer, a smart phone, electric vehicle, and the like.

The lithium battery may have improved lifetime characteristics and high rate characteristics, and thus may be applicable in an electric vehicle (EV), for example, in a hybrid vehicle such as plug-in hybrid electric vehicle (PHEV). The lithium battery may be applicable to the high-power storage field, for example, in an electric bicycle, a power tool, and the like.

One or more embodiments of the present disclosure will be described in detail with reference to the following examples. However, these examples are not intended to limit the scope of the one or more embodiments of the present disclosure.

EXAMPLES

Preparation Example 1

Synthesis of Compound of Formula 3

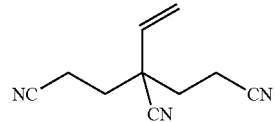

Formula 3

A mixture of allyl cyanide (tech. 90%, 14.91 g, 0.20 mol) and acrylonitrile (21.22 g, 0.40 mol) was dropwise added into a solution of benzyltrimethylammonium hydroxide (Triton-B, 1.2 g) dissolved in tert-butanol (40 g) over about 1.5 hours, while the solution was cooled down in an ice bath to maintain a temperature of the reaction mixture at about 10~15° C. Further, the temperature of the reaction mixture was maintained at about 10~15° C. for about 2 hours after completion of the dropwise addition. Afterward, the reaction mixture was stirred at room temperature overnight.

The reaction mixture was acidified with an aqueous HCl solution to a pH of 5, dissolved in ethylene dichloride, washed with water, and then evaporated to dryness to afford a brown viscous residue.

The brown viscous residue was subjected to distillation in a vacuum (at about 158-176° C. and 0.1 Torr) to obtain about 20.22 g of a crude product (Yield: 58%) as a brown oil, which partially crystallized under storage. This crude product was added into 700 mL of boiling water along with 0.5 g of activated charcoal to obtain a hot mixture. The hot mixture was filtered to obtain a hot filtrate, which was then cooled to room temperature to obtain an almost colorless precipitate of the product via crystallization. The precipitate was filtered off and the resulting filtrate was partially evaporated under reduced pressure to obtain additional amount of almost colorless product. The combined portions of the product were firstly dried on the air and then under reduced pressure in a dessicator containing $P_2O_5$ to obtain 11.19 g of an almost colorless compound of Formula 3. (Yield: 32%).

$^1$H NMR (400 MHz, CDCl$_3$), δ (ppm): 2.24 (m, 8H), 5.55 (m, 3H); $^{13}$C NMR (100 MHz, CDCl$_3$), δ (ppm): 13.59, 34.00, 45.67, 118.05, 121.89, 132.80.

Preparation Example 2

Synthesis of Compound of Formula 6

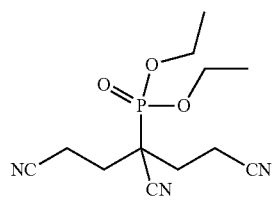

Formula 6

Acrylonitrile (5.84 g, 0.11 mol) was dropwise added into a solution of diethyl cyanomethylphosphonate (8.86 g, 0.05 mol) and potassium tert-butoxide (0.56 g, 0.005 mol) dissolved in tert-butanol (10 g) over about 0.5 hour, while the solution was cooled in an ice bath to maintain a temperature of the reaction mixture at about 10~15° C. The reaction mixture was stirred at room temperature for about 1 hour after completion of the dropwise addition, and then slowly heated to about 90° C.

A solution of potassium tert-butoxide (0.2 g) in tert-butanol (3 g) was added into the reaction mixture, which was then heated at about 90° C. for about 2 hours, and then left at room temperature overnight.

Acetic acid (0.45 g, 0.0075 mol) was added into the reaction mixture, which was then subjected to rotary evaporation in a 50° C. water bath to obtain brown oil, followed by flash chromatography on silica gel with ethylacetate-hexane (2:1 by volume) and evaporation of the solvent. The resulting yellowish residue was treated with benzene to obtain a suspension, which was then filtered. The resulting filtrate was evaporated to dryness to obtain yellowish oil, which crystallized upon standing. The yellowish oil was reprecipitated twice from diethyl ether (two portions of 200 mL each) using a Soxhlet apparatus, followed by drying under reduced pressure in a dessicator containing P$_2$O$_5$ to obtain about 8.66 g of colorless crystals of a compound of Formula 6 (Yield: 63%).

$^1$H NMR (400 MHz, CDCl$_3$), δ (ppm): 1.40 (dt, J=7.1/0.5 Hz, 6H, CH$_3$), 2.22 (m, 4H, CCH$_2$), 2.74 (m, 4H, CH$_2$CN), 4.29 (m, 4H, OCH$_2$); $^{13}$C NMR (100 MHz, CDCl$_3$), δ (ppm): 13.93, 16.44/16.49, 29.47/29.51, 38.76/40.19, 65.31/65.38, 115.98/116.05, 117.88; $^{31}$P NMR (162 MHz, CDCl$_3$), δ (ppm): 18.11.

Preparation Example 3

Synthesis of Compound of Formula 9

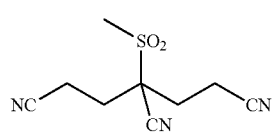

Formula 9

Potassium tert-butoxide (0.56 g, 0.005 mol) was added into a solution of 2-(methylsulfonyl)acetonitrile (2.38 g, 0.02 mol) dissolved in dioxane (15 mL), and then stirred for about 10 minutes to be completely dissolved. Subsequently, a solution of acrylonitrile 2.12 g (0.04 mol) in dioxane (2 mL) was dropwise added into the solution for over about 5 minutes. The temperature of the reaction mixture slowly rose by itself to about 45° C. The reaction mixture was allowed to cool down to room temperature and left at this temperature for totally about 5 hours while stirring, followed by acidification with acetic acid (0.5 mL). The reaction mixture was subjected to rotary evaporation under reduced pressure, and the resulting residue was thoroughly washed with water to obtain a crude product. This crude product was dissolved in boiling water (80 mL) to which activated charcoal (0.5 g) was added. The reaction mixture was boiled for 5 minutes then immediately filtered to obtain a hot filtrate, which was then cooled down to room temperature, and left until an almost colorless precipitate was precipitated. This precipitate was filtered, and dried under reduced pressure to obtain about 3.68 g of colorless crystals of a compound of Formula 9 (Yield: 82%).

$^1$H NMR (400 MHz, acetone-d6), δ (ppm): 2.67 (m, 4H), 2.93 (t, J=7.8 Hz, 4H), 3.43 (s, 3H); $^{13}$C NMR (100 MHz, acetone-d6), δ (ppm): 13.19, 27.34, 36.81, 62.93, 114.59, 118.03.

Preparation Example 4

Synthesis of Compound of Formula 10

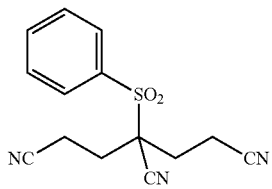

Formula 10

A solution of acrylonitrile (2.12 g, 0.04 mol) dissolved in dioxane (2 mL) was dropwise added into a solution of 2-(phenylsulfonyl)acetonitrile (3.62 g, 0.02 mol) and potassium tert-butoxide (0.56 g, 0.005 mol) dissolved in dioxane (15 mL) while stirring over 5 minutes. The temperature of the reaction mixture slowly rose by itself to about 45° C. to give an almost transparent yellow solution, which was allowed to cool to room temperature and left at this temperature for about 5 hours while stirring. During this time a bulk precipitate of the crude product gradually formed. After neutralization with acetic acid (0.5 mL), the reaction mixture was diluted with isopropanol (50 mL), filtered and the precipitate was washed with isopropanol, then extracted with ethanol (250 mL) using a Soxhlet apparatus to obtain almost colorless crystals. These colorless crystals were filtered, washed with ethanol, and dried under reduced pressure in a dessicator containing P$_2$O$_5$ to obtain about 2.79 g of the product (Yield: 48.5%). The filtrate was partially distilled to additionally obtain about 0.99 g of less pure product. Accordingly, a total yield of a compound of Formula 10 was about 66% (3.78 g).

$^1$H NMR (400 MHz, acetone-d$_6$), δ (ppm): 2.54 (m, 4H), 2.90 (m, 4H), 7.84 (m, 2H), 7.98 (m, 1H), 8.11 (m, 2H); $^{13}$C NMR (100 MHz, acetone-$d_6$), δ (ppm): 13.15, 27.76, 64.20, 114.56, 117.90, 130.15, 130.98, 133.41, 136.31.

Preparation Example 5

Synthesis of Compound of Formula 11

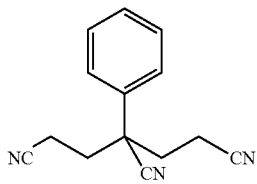

Formula 11

A solution of acrylonitrile (2.12 g, 0.04 mol) dissolved in tert-butanol (2 mL) was dropwise added into a solution of 2-phenylacetonitrile (2.34 g, 0.02 mol) and Triton B (2.09 g, 0.005 mol) dissolved in tert-butanol (5 mL) over about 15 minutes while stirring and cooling the solution to about 0-5° C. After that the reaction mixture was left at room temperature for about 5 hours, followed by neutralization with a 2N HCl solution (2.5 mL) to obtain a precipitate, which was then filtered after dilution with ethanol (about 5 mL), washed with ethanol, and then dried on the air and finally under reduced pressure in a dessicator containing $P_2O_5$ to obtain about 3.31 g of colorless crystals of a compound of Formula 11 (Yield: 74%).

$^1$H NMR (400 MHz, CDCl3), δ (ppm): 2.21 (dm, 4H), 2.47 (m, 4H), 7.44 (m, 5H); 13C NMR (100 MHz, CDCl3): 13.77, 36.27, 47.19, 117.86, 119.44, 125.82, 129.77, 130.19, 133.48.

Preparation Example 6

Synthesis of Compound of Formula 12

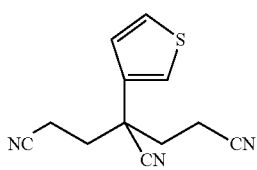

Formula 12

A solution of acrylonitrile (2.12 g, 0.04 mol) dissolved in tert-butanol (2 mL) was dropwise added into a solution of 2-(thiophene-3-yl)acetonitrile (2.46 g, 0.02 mol) and potassium tert-butoxide (0.56 g, 0.005 mol) dissolved in tert-butanol (5 mL) over about 15 minutes while stirring and cooling the solution to about 0-5° C. The mixture was heated at about 50° C. for about 1 hour, followed by cooling down to room temperature and neutralization with acetic acid (0.5 mL) to afford a brown oil of a crude product, which solidified when left at room temperature. The mixture was diluted with water and the solidified crude product was carefully crushed with a spatula in the reaction flask, filtered off and washed with water. The wet crude product was extracted several times with a mixture of isopropanol and n-hexane (7:2 by volume). The combined extracts were evaporated until a precipitate of the crude product has formed. It was filtered off and then subjected to fractional crystallization using a mixture of isopropanol and n-hexane, and finally dried under reduced pressure in a dessicator containing $P_2O_5$ to obtain about 3.02 g of an almost colorless compound of Formula 12 (Yield: 66%).

$^1$H NMR (400 MHz, CDCl$_3$), δ (ppm): 2.22 (m, 4H), 2.45 (m, 4H), 6.96 (m, 1H), 7.41 (m, 1H), 7.51 (m, 1H); $^{13}$C NMR (100 MHz, CDCl$_3$), δ (ppm): 13.82, 36.06, 44.06, 117.70, 119.55, 123.36, 124.67, 130.07, 134.91.

Preparation of Organic Electrolytic Solutions

Example 1

Electrolyte Including a Compound of Formula 3

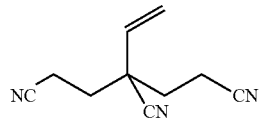

Formula 3

0.90M LiPF$_6$ and 0.2 wt % of LiBF$_4$ as lithium salts, and about 6 wt % of fluoroethylenecarbonate (FEC), about 2 wt % of 1,3-propane sultone (PS), about 0.5 wt % of vinylethylenecarbonate (VEC), and about 3 wt % of a compound of Formula 3 were added into a mixed solvent of ethylenecarbonate (EC), ethylmethylcarbonate (EMC), and diethylcarbonate (DEC) in a ratio of 3:5:2 by volume to prepare an organic electrolytic solution. The amounts of the additives were based on a total weight of the organic electrolytic solution.

Example 2

Electrolyte Including about 1 wt % of a Compound of Formula 6

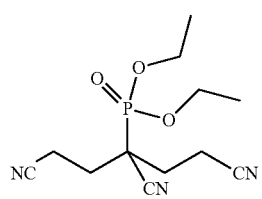

Formula 6

An organic electrolytic solution was prepared in the same manner as in Example 1, except that about 1 wt % of a compound of Formula 6 instead of about 3 wt % of the compound of Formula 3 was used as an additive.

Example 3

Electrolyte Including about 2 wt % of a Compound of Formula 6

An organic electrolytic solution was prepared in the same manner as in Example 1, except that about 2 wt % of a compound of Formula 6 instead of about 3 wt % of the compound of Formula 3 was used as an additive.

Example 4

Electrolyte Including about 3 wt % of a Compound of Formula 6

An organic electrolytic solution was prepared in the same manner as in Example 1, except that about 3 wt % of a compound of Formula 6 instead of about 3 wt % of the compound of Formula 3 was used as an additive.

Example 5

Electrolyte Including a Compound of Formula 9

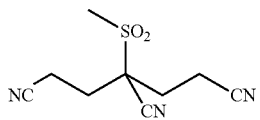

Formula 9

An organic electrolytic solution was prepared in the same manner as in Example 1, except that about 2 wt % of a compound of Formula 9 instead of about 3 wt % of the compound of Formula 3 was used as an additive.

Example 6

Electrolyte Including a Compound of Formula 10

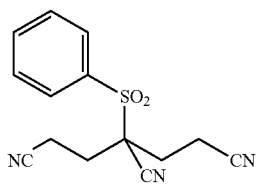

Formula 10

An organic electrolytic solution was prepared in the same manner as in Example 1, except that about 2 wt % of a compound of Formula 10 instead of about 3 wt % of the compound of Formula 3 was used as an additive.

Example 7

Electrolyte Including a Compound of Formula 11

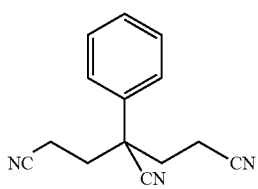

Formula 11

An organic electrolytic solution was prepared in the same manner as in Example 1, except that about 2 wt % of a compound of Formula 11 instead of about 3 wt % of the compound of Formula 3 was used as an additive.

Example 8

Electrolyte Including a Compound of Formula 12

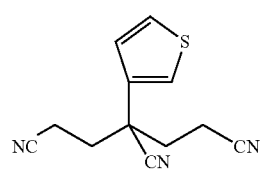

Formula 12

An organic electrolytic solution was prepared in the same manner as in Example 1, except that about 3 wt % of succinonitrile and about 2 wt % of a compound of Formula 12, instead of about 3 wt % of the compound of Formula 3, was used as additives.

Reference Example 1

0.90M $LiPF_6$ and 0.2 wt % $LiBF_4$ as lithium salts, and about 6 wt % of fluoroethylenecarbonate (FEC), about 2 wt % of 1,3-propane sultone (PS), about 0.5 wt % of vinylethylenecarbonate (VEC), and about 3 wt % of succinonitrile were added into a mixed solvent of ethylenecarbonate (EC), ethylmethylcarbonate (EMC), and diethylcarbonate (DEC) in a ratio of 3:5:2 by volume to prepare an organic electrolytic solution. The amounts of the additives were based on a total weight of the organic electrolytic solution.

Comparative Example 1

Electrolyte Including a Compound of Formula 14

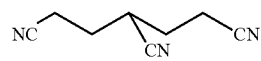

Formula 14

0.90M $LiPF_6$ and 0.2 wt % $LiBF_4$ as lithium salts, and about 6 wt % of fluoroethylenecarbonate (FEC), about 2 wt % of 1,3-propane sultone (PS), about 0.5 wt % of vinylethylenecarbonate (VEC), and about 3 wt % of a compound of Formula 14 were added into a mixed solvent of ethylenecarbonate (EC), ethylmethylcarbonate (EMC), and diethylcarbonate (DEC) in a ratio of 3:5:2 by volume to prepare an organic electrolytic solution. The amounts of the additives were based on a total weight of the organic electrolytic solution.

Manufacture of Lithium Batteries

Example 9

Manufacture of Negative Electrode 98 wt % of artificial graphite (BSG-L, available from Tianjin BTR New Energy Technology Co., Ltd., Tianjin City, China), 1.0 wt % of a styrene-butadiene rubber (SBR) binder (available from ZEON Corporation, Tokyo, Japan,), and 1.0 wt % of carboxymethylcellulose (CMC, available from NIP- PON A&L, Osaka, Japan) were mixed together, followed by adding distilled water and stirring with a mechanical stirrer for about 60 minutes to prepare a negative active material slurry, which was then coated on a 10 μm-thick Cu current collector to a thickness of about 60 μm with a doctor blade. Then, the resultant was dried in a hot-air dryer at about 100° C. for about 0.5 hour, and then at about 120° C. in a vacuum for 4 hours, followed by roll-pressing to manufacture a negative electrode plate.

Manufacture of Positive Electrode 97.45 wt % of $LiCoO_2$, 0.5 wt % of artificial graphite (SFG6, Timcal, Bodio, Switzerland) powder as a conducting agent, 0.7 wt % of carbon black (Ketjen black, ECP), 0.25 wt % of modified acrylonitrile rubber (BM-720H, available from Zeon Corporation), 0.9 wt % of polyvinylidene fluoride (PVdF, 56020, available from Solvay, Brussels, Belgium), and 0.2 wt % of polyvinylidene fluoride (PVdF, 55130, available from Solvay) were mixed together and added into a N-methyl-2-pyrrolidone solvent followed by stirring with a mechanical stirrer for about 30 minutes to prepare a positive active material slurry, which was then coated on a 20 μm-thick aluminum (Al) current collector to a thickness of about 60 μm with a doctor blade. Then, the resultant was dried in a hot-air dryer at about 100° C. for about 0.5 hour, and then at about 120° C. in a vacuum for 4 hours, followed by roll-pressing to manufacture a positive electrode plate.

A ceramic-coated polyethylene separator, which has a thickness of about 14 μm, ceramic being coated on a side contacting the positive electrode, was used as a separator, and the organic electrolyte solution of Example 1 was used to manufacture a lithium battery.

Examples 10 to 16

Lithium batteries were manufactured in the same manner as in Example 16, except that the organic electrolytic solutions of Examples 2 to 8 instead of the organic electrolytic solution of Example 1 were used, respectively.

Reference Example 2

A lithium battery was manufactured in the same manner as in Example 9, except that the organic electrolytic solution of Reference Example 1 instead of the organic electrolytic solution of Example 1 was used.

Comparative Example 2

A lithium battery was manufactured in the same manner as in Example 9, except that the organic electrolytic solution of Comparative Example 1 instead of the organic electrolytic solution of Example 1 was used.

Evaluation Example 1

Evaluation of Charge-Discharge Characteristics at Room Temperature (25° C.)

The lithium batteries of Examples 9 to 16, Reference Example 2, and Comparative Example 2 were each charged at a constant current of 0.1 C rate at about 25° C. to a voltage of about 4.35V (with respect to Li), and then charged at a constant voltage of about 4.35V to a current of about 0.05 C (cut-off current), followed by discharging with a constant current of 0.1 C until the voltage reached about 2.75V (with respect to Li) (formation process, 1st cycle).

Each of the lithium batteries through the 1st cycle of the formation process was charged at a constant current of 0.2 C rate at about 25° C. to a voltage of about 4.35V (with respect to Li), and then charged at a constant voltage of about 4.35V to a current of 0.05 C (cut-off current), followed by discharging with a constant current of 0.2 C until the voltage reached about 2.75V (with respect to Li) (formation process, 2nd cycle).

Subsequently, the lithium battery through the 2nd cycle of the formation process was charged with a constant current of 0.5 C at about 25° C. until the voltage of the lithium battery reached about 4.35V (with respect to Li), and then charged at a constant voltage of about 4.35V to a current of 0.05 C rate (cut-off current), followed by discharging with a constant current of 0.5 C until the voltage reached about 2.75V (with respect to Li) (formation process, 3rd cycle).

After completing the $1^{st}$ to $3^{rd}$ cycles of the formation process, the lithium battery was charged at a constant current of 1.0 C rate at about 25° C. to a voltage of about 4.35V (with respect to Li), and then charged at a constant voltage of about 4.35V to a current of 0.05 C (cut-off current), followed by discharging with a constant current of about 1.0 C until the voltage reached about 2.75V (with respect to Li). This cycle of charging and discharging was repeated 200 times.

The charge-discharge cycle test was performed with a rest time of about 10 minutes between each charge-discharge cycles.

Figure 1B:
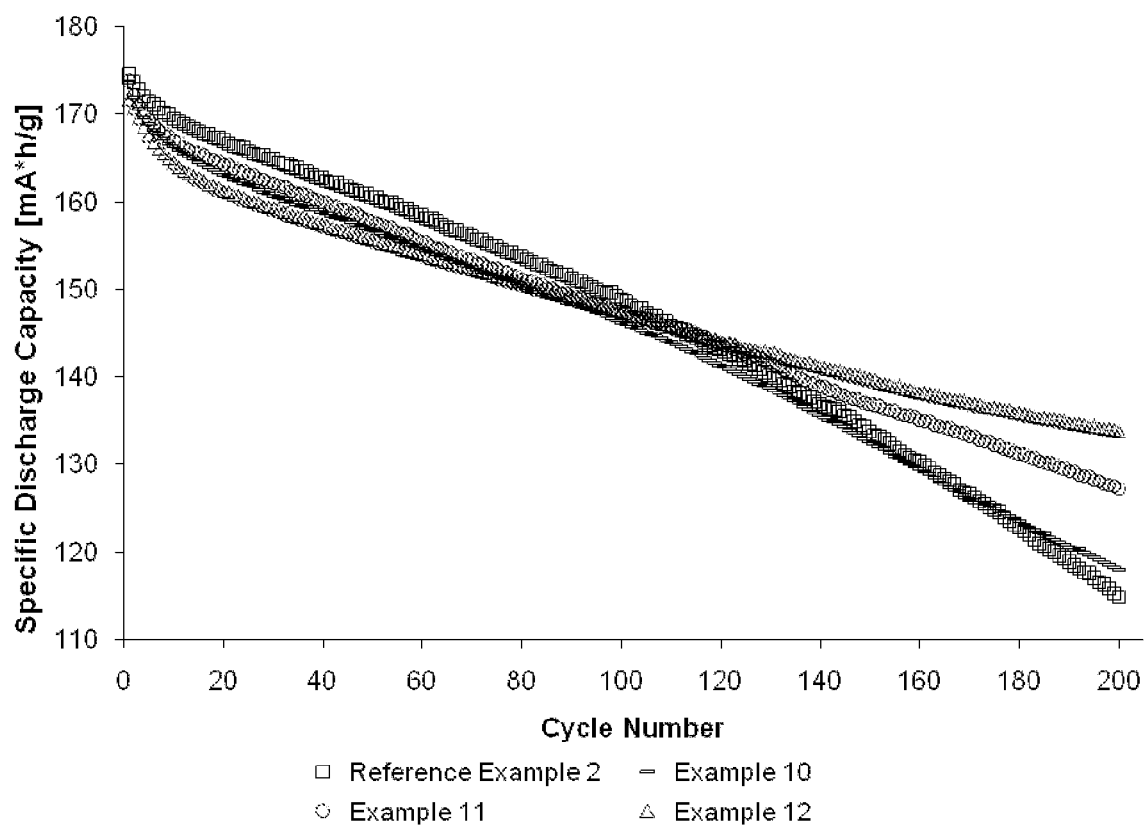
FIG. 1B is a graph of discharge capacity with respect to number of charge/discharge cycles in lithium batteries of Examples 10 to 12 and Reference Example 2.
Figure 1C:
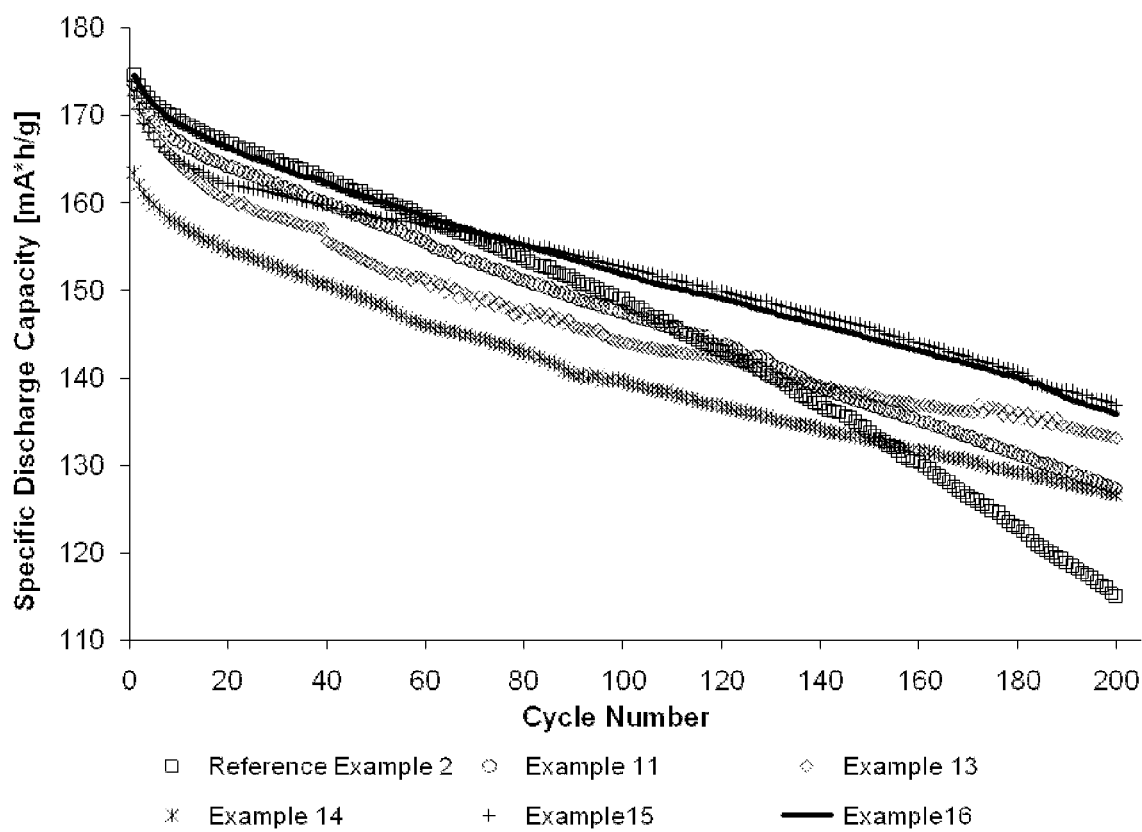
FIG. 1C is a graph of discharge capacity with respect to number of charge/discharge cycles in lithium batteries of Examples 11, Examples 13 to 16, and Reference Example 2.
Figure 2A:
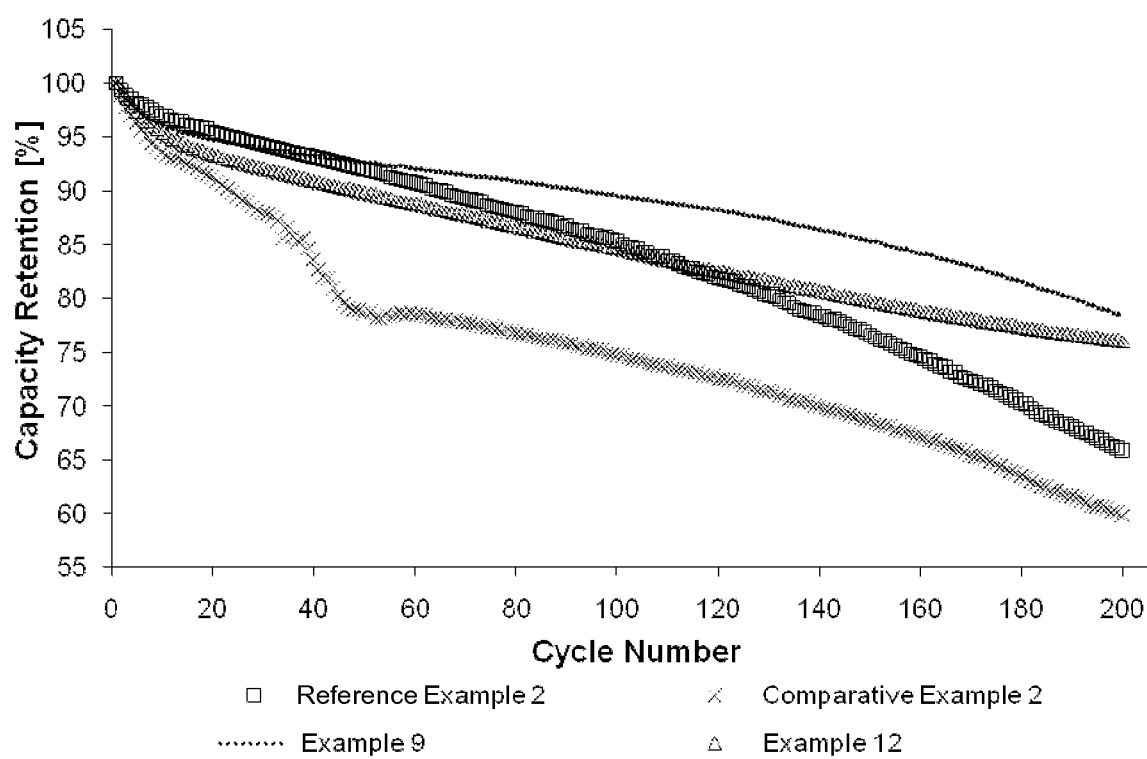
FIG. 2A is a graph of capacity retention with respect to number of charge/discharge cycles in the lithium batteries of Examples 9 and 12, Reference Example 2, and Comparative Example 2.
Figure 2B:
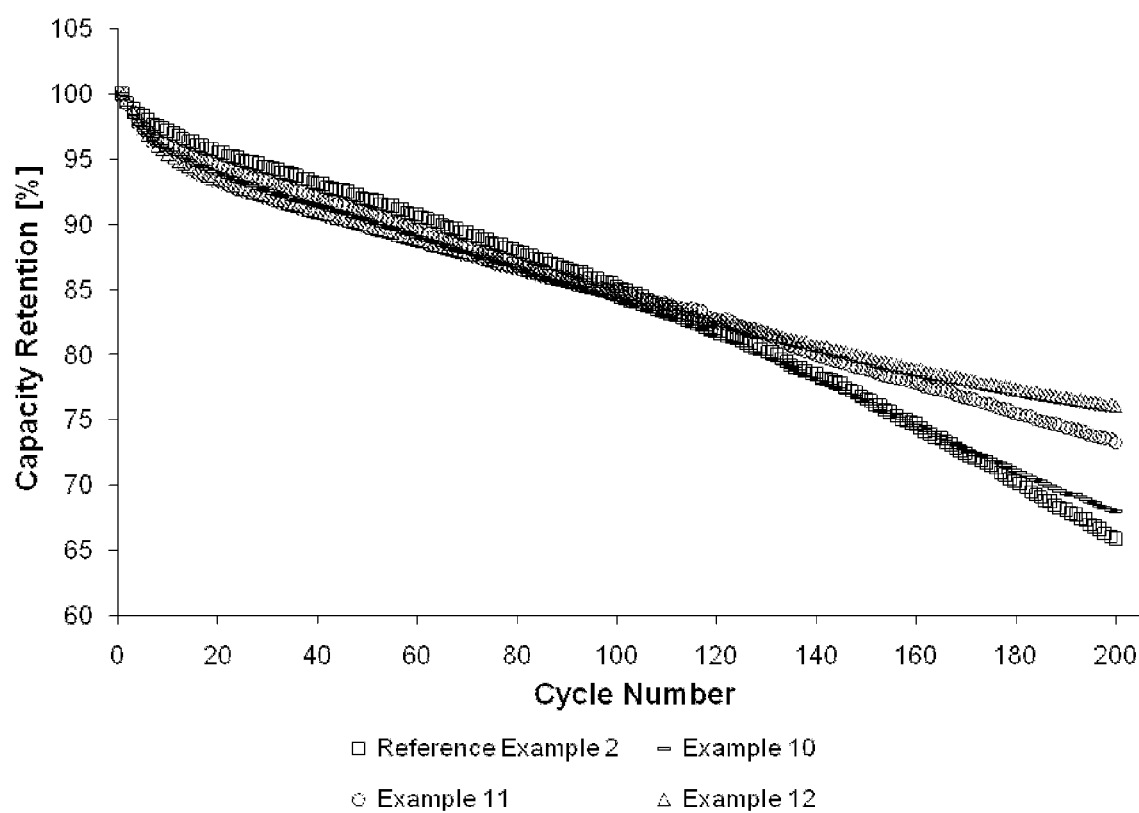
FIG. 2B is a graph of capacity retention with respect to number of charge/discharge cycles in the lithium batteries of Examples 10 to 12 and Reference Example 2.
Figure 2C:
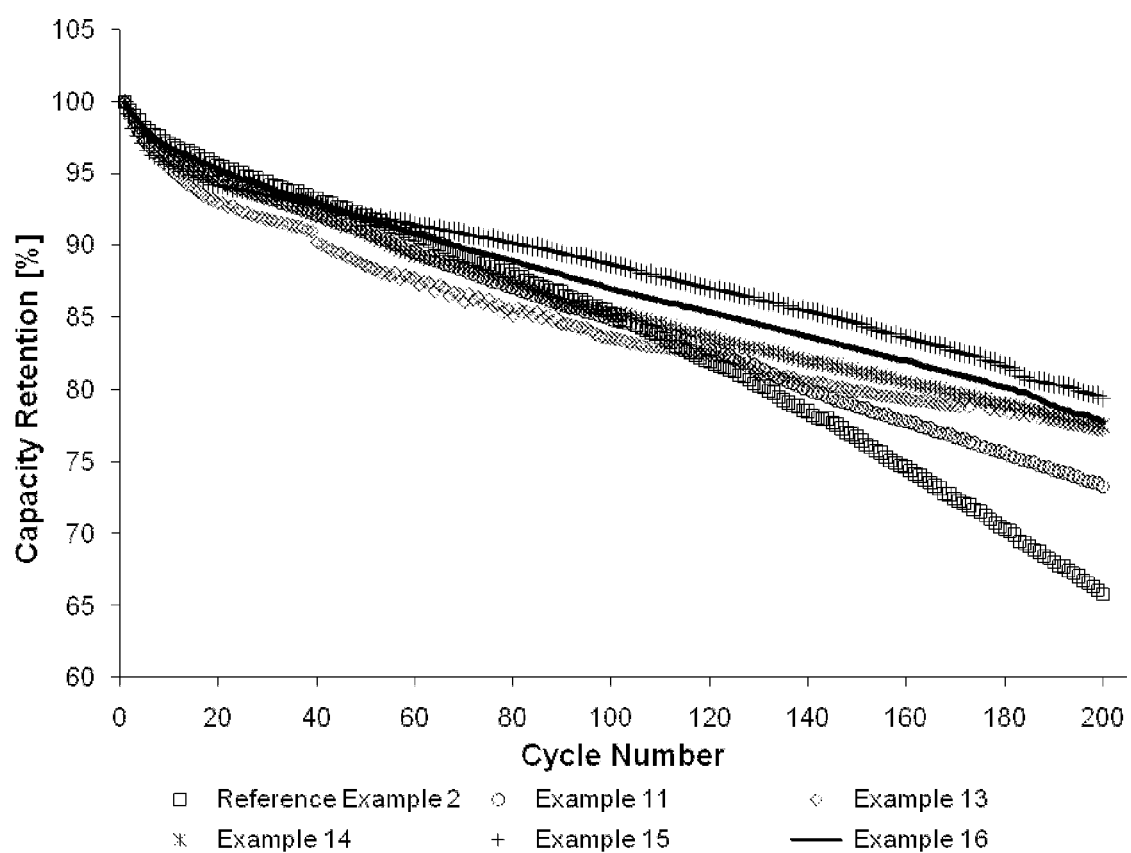
FIG. 2C is a graph of capacity retention with respect to number of charge/discharge cycles in the lithium batteries of Examples 11, Examples 13 to 16, and Reference Example 2.

Some of the charge-discharge test results are shown in Table 1 and FIG. 1. A capacity retention rate at 200th cycle is defined as Equation 1 below.

$$\text{Capacity retention rate} = [\text{Charge capacity at } 200^{th} \text{ cycle}/\text{Charge capacity at } 1^{st} \text{ cycle}] \times 100 \quad \text{Equation 1}$$

For the lithium battery of Example 5, the charge capacity and the capacity retention rate were calculated after the $100^{th}$ cycle of charging and discharging.

TABLE 1

| Example | Charge capacity at $200^{th}$ cycle | Capacity retention rate at $200^{th}$ cycle |
|---|---|---|
| Example 9 | 136.1 | 78.4 |
| Example 10 | 118.0 | 68.0 |
| Example 11 | 127.3 | 73.3 |
| Example 12 | 133.8 | 76.1 |
| Example 13 | 133.2 | 77.2 |
| Example 14 | 126.6 | 77.4 |
| Example 15 | 136.8 | 79.4 |
| Example 16 | 135.8 | 77.8 |
| Reference Example 2 | 114.9 | 65.8 |
| Comparative Example 2 | 103.2 | 59.9 |

Referring to Table 1 and FIG. 1, the lithium batteries of Examples 9 to 16, each including an additive according to the one or more embodiments of the present invention, were found to be significantly improved in charge capacity and lifetime characteristics as compared with the lithium battery of Reference Example 1 including no additive and the lithium battery of Comparative Example 2 including a conventional additive.

In the present disclosure, the terms "Preparation Example," "Example," "Reference Example," "Evaluation Example" and "Comparative Example" are used arbitrarily to simply identify a particular example or experimentation and should not be interpreted as admission of prior art. It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. An additive for an electrolyte of a lithium battery, comprising:
a compound having the structure of Formula 1:

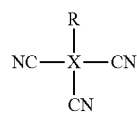

Formula 1 wherein, in Formula 1,
R is vinyl, allyl, ethynyl, propargyl, naphthyl, triazolyl, or thienyl; and
X is an unsubstituted $C_2$-$C_{20}$ alkylene group, or X is a $C_2$-$C_{20}$ alkylene group substituted with one or more $R^{20}$ groups where each $R^{20}$ is independently selected from the group consisting of a halo, an unsubstituted or substituted $C_1$-$C_{20}$ alkyl, an unsubstituted or substituted $C_2$-$C_{20}$ alkenyl, an unsubstituted or substituted $C_2$-$C_{20}$ alkynyl, an unsubstituted or substituted $C_3$-$C_8$ cycloalkyl, an unsubstituted or substituted —O—($C_1$-$C_8$ alkyl), an unsubstituted or substituted $C_6$-$C_{40}$ aryl, an unsubstituted or substituted $C_1$-$C_{40}$ heteroaryl, an unsubstituted or substituted $C_2$-$C_{40}$ heterocyclyl and a polar functional group including a hetero atom.

2. The additive for an electrolyte of a lithium battery of claim 1, wherein the compound having the structure of Formula 1 is a compound having the structure of Formula 2:

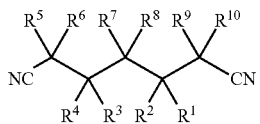

Formula 2 wherein, in Formula 2,
$R^1$ to $R^6$ and $R^8$ to $R^{10}$ are each independently a hydrogen atom, a halogen atom, —CN, $C_1$-$C_{10}$ alkyl group substituted with a halogen atom or a cyano group, a $C_2$-$C_{10}$ alkenyl group unsubstituted or substituted with a halogen atom or a cyano group, a $C_2$-$C_{20}$ alkynyl group unsubstituted or substituted with a halogen atom or a cyano group, —P($OR^{18}$)($OR^{19}$), —$R^{17}$P($OR^{18}$)($OR^{19}$), —OP($OR^{18}$)($OR^{19}$), —$R^{17}$OP($OR^{18}$)($OR^{19}$), —P(=O)($OR^{18}$)($OR^{19}$), —$R^{17}$P(=O)($OR^{18}$)($OR^{19}$), —OP(=O)($OR^{18}$)($OR^{19}$), —$R^{17}$OP(=O)($OR^{18}$)($OR^{19}$), —$R^{17}$SO$_2R^{19}$, or —SO$_2R^{19}$;
$R^7$ is CN; and
$R^8$ is vinyl, allyl, ethynyl, propargyl, naphthyl, triazolyl, or thienyl;
$R^{17}$ is a $C_1$-$C_{10}$ alkylene group unsubstituted or substituted with a halogen atom or a cyano group; and
$R^{18}$ and $R^{19}$ are each independently a $C_1$-$C_{10}$ alkyl group unsubstituted or substituted with a halogen atom or a cyano group, a $C_6$-$C_{40}$ aryl group unsubstituted or substituted with a halogen atom or a cyano group, or a $C_1$-$C_{40}$ heteroaryl group unsubstituted or substituted with a halogen atom or a cyano group.

3. The additive for an electrolyte of a lithium battery of claim 2, wherein the compound having the structure of Formula 2 is a compound having the structure of:

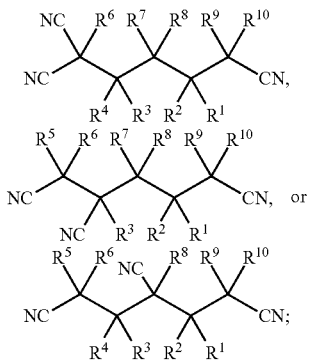

and $R^8$ is vinyl, allyl, naphthyl, triazolyl, or thienyl.

4. The additive for an electrolyte of a lithium battery of claim 1, wherein X is an unsubstituted $C_{2-8}$ alkylene group.

5. The additive for an electrolyte of a lithium battery of claim 1, wherein the compound having the structure of Formula 1 is a compound having the structure of Formula 13:

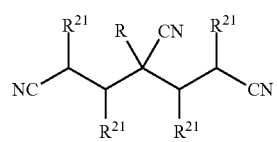

Formula 13 wherein, in Formula 13,
each $R^{21}$ is independently selected from the group consisting of hydrogen, an unsubstituted or substituted $C_1$-$C_{20}$ alkyl, an unsubstituted or substituted $C_2$-$C_{20}$ alkenyl, an unsubstituted or substituted $C_2$-$C_{20}$ alkynyl, an unsubstituted or substituted $C_3$-$C_8$ cycloalkyl, an unsubstituted or substituted —O—($C_1$-$C_8$ alkyl), an unsubstituted or substituted $C_6$-$C_{40}$ aryl, an unsubstituted or substituted $C_1$-$C_{40}$ heteroaryl, an unsubstituted or substituted $C_2$-$C_{40}$ heterocyclyl and a polar functional group including a hetero atom.

6. The additive for an electrolyte of a lithium battery of claim 5, wherein R is vinyl or allyl.

7. The additive for an electrolyte of a lithium battery of claim 5, wherein R is vinyl, allyl, ethynyl, propargyl, naphthyl, triazolyl, or thienyl.

8. An additive for an electrolyte of a lithium battery, comprising:
a compound having the structure of one of Formulae 3 to 10 or Formula 12:

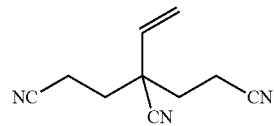

Formula 3

-continued

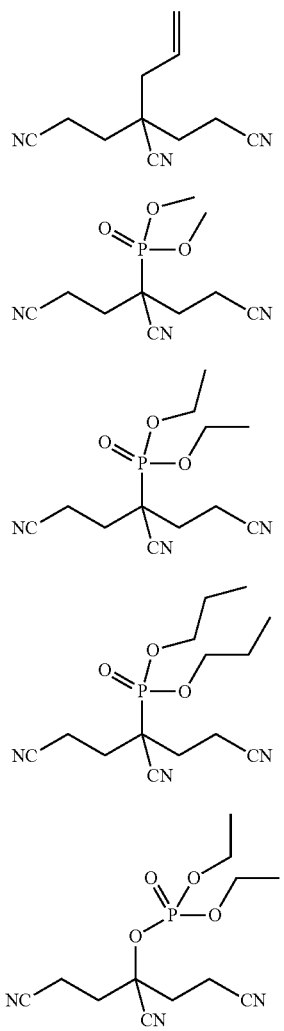

Formula 4

Formula 5

Formula 6

Formula 7

Formula 8

-continued

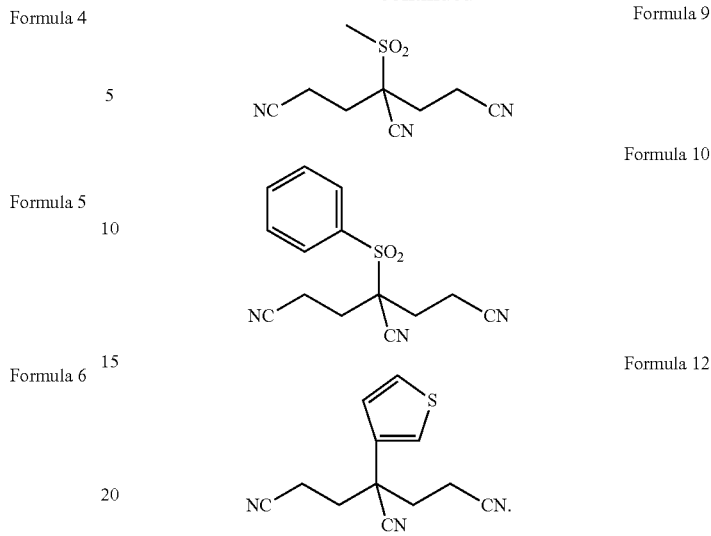

Formula 9

Formula 10

Formula 12

9. An electrolyte, comprising:
   a lithium salt;
   a non-aqueous organic solvent; and
   the additive of claim 8.

10. The electrolyte of claim 9, wherein the additive is present in an amount of from about 0.1 wt % to about 10 wt % based on total weight of the electrolyte.

11. The electrolyte of claim 9, wherein the concentration of the lithium salt in the electrolyte is from about 0.01 M to about 2.0 M.

12. A rechargeable lithium battery comprising:
   a negative electrode;
   a positive electrode; and
   the electrolyte of claim 9.

13. The rechargeable lithium battery of claim 12, wherein the negative electrode comprises graphite.

14. The rechargeable lithium battery of claim 12, wherein the operating voltage is about 3.8V or greater.

* * * * *